(12) United States Patent
Kashihara et al.

(10) Patent No.: US 6,836,591 B2
(45) Date of Patent: Dec. 28, 2004

(54) ARRAYED WAVEGUIDE GRATING TYPE OPTICAL MULTIPLEXER/DEMULTIPLEXER AND OPTICAL WAVEGUIDE CIRCUIT

(75) Inventors: Kazuhisa Kashihara, Tokyo (JP); Kazutaka Nara, Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 0 days.

(21) Appl. No.: 09/741,824

(22) Filed: Dec. 22, 2000

(65) Prior Publication Data

US 2003/0035622 A1 Feb. 20, 2003

(30) Foreign Application Priority Data

Dec. 27, 1999 (JP) .......................................... 11-370602
Mar. 3, 2000 (JP) .................................... 2000-058646
Apr. 4, 2000 (JP) .................................... 2000-102473
Sep. 20, 2000 (JP) .................................... 2000-285448

(51) Int. Cl.$^7$ ................................................ G02B 6/34
(52) U.S. Cl. .......................... 385/37; 385/46; 385/10; 385/16
(58) Field of Search ............................ 385/10, 16–24, 385/37, 38, 46

(56) References Cited

U.S. PATENT DOCUMENTS

| | | | |
|---|---|---|---|
| 5,537,432 A | | 7/1996 | Mehuys et al. ................ 372/50 |
| 5,629,992 A | * | 5/1997 | Amersfoort et al. ....... 385/17 X |
| 5,748,811 A | | 5/1998 | Amersfoort et al. .......... 385/15 |
| 6,069,990 A | | 5/2000 | Okawa et al. ................. 385/43 |
| 6,195,482 B1 | | 2/2001 | Dragone ...................... 385/28 |
| 6,671,433 B2 | * | 12/2003 | Kashihara et al. ............ 385/37 |

FOREIGN PATENT DOCUMENTS

| | | |
|---|---|---|
| EP | 0 484 878 | 5/1992 |
| FR | 2 742 882 | 6/1997 |
| JP | 5-313029 | 11/1993 |
| JP | 8-122557 | 5/1996 |
| JP | 9-297228 | 11/1997 |

OTHER PUBLICATIONS

R. M. Lorenzo, et al., IEEE Proceedings: Optoelectronics, vol. 145, No. 1, XP–000780219, pp. 65–69, "Improved Self–Imaging Characteristics in 1 X N Multimode Couplers", Feb. 1, 1998.

* cited by examiner

Primary Examiner—Phan T. H. Palmer
(74) Attorney, Agent, or Firm—Oblon, Spivak, McClelland, Maier & Neustadt, P.C.

(57) ABSTRACT

An arrayed waveguide grating type optical multiplexer/demultiplexer in which the 1 dB band width is large, the ripple is small, and the degradation of the adjacent crosstalk can be controlled. A waveguide forming portion is formed on a substrate. The waveguide forming portion includes an optical input waveguides, a first slab waveguide, an arrayed waveguide including a plurality of channel waveguides arranged side by side and which have different lengths with the differences preset, a second slab waveguide, and a plurality of optical output waveguides arranged side by side, all of the components being connected in the order stated. A single mode straight waveguide narrower than the optical input waveguides is provided at the output end of at least one or more optical input waveguides. A multi-mode trapezoidal waveguide whose width increases toward the arrayed waveguide is provided at the output end of the straight waveguide. An upper base of the trapezoidal waveguide is longer than the diameter of the optical input waveguide.

45 Claims, 22 Drawing Sheets

ARRAYED WAVEGUIDE GRATING TYPE OPTICAL MULTIPLEXER/DEMULTIPLEXER AND OPTICAL WAVEGUIDE CIRCUIT

CROSS-REFERENCES TO RELATED DOCUMENTS

The present application is related to and claims priority on Japanese Patent Applications 11-370,602, filed on Dec. 27, 1999, 2000-58646, filed on Mar. 3, 2000, and 2000-102473, filed on Apr. 4, 2000, the entire contents of each of which are hereby incorporated herein by reference.

BACKGROUND OF THE INVENTION

1. Field of the Invention

The present invention relates to an arrayed waveguide grating type optical multiplexer/demultiplexer and an optical waveguide circuit which are used in the field of optical communications and similar fields.

2. Discussion of the Background

Recently, in optical communications research and development of optical wavelength division multiplexing communications has actively been pursued as a way to exponentially increase transmission volume, and the results are being put into practice. Optical wavelength division multiplexing communications uses, for example, a technique of wavelength division multiplexing on a plurality of light beams each having a different wavelength from one another to transmit them. For systems using such optical wavelength division multiplexing communications, an optical multiplexer/demultiplexer is necessary which demultiplexes light that has undergone wavelength division multiplexing to be transmitted to create a plurality of light beams each having a different wavelength from one another, and which multiplexes a plurality of light beams each having a different wavelength from one another.

An optical multiplexer/demultiplexer of this kind preferably has the following capabilities. Firstly, it should be capable of multiplexing and demultiplexing light with a wavelength interval as narrow as possible within a range of a preset wavelength. Secondly, it should be excellent in wavelength flatness in the vicinity of the central wavelength of light to be multiplexed/demultiplexed. Thirdly and lastly, it should have low crosstalk between one passing wavelength and another passing wavelength adjacent thereto (hereinafter referred to as adjacent crosstalk).

Of the desired capabilities listed above, the first capability is met by, for example, an arrayed waveguide grating (AWG) type optical multiplexer/demultiplexer. An arrayed waveguide grating type optical multiplexer/demultiplexer such as shown in FIG. 19A, for example, is obtained by forming on a substrate 11 an optical waveguide unit 10 that has a waveguide structure.

The above waveguide structure includes one or more optical input waveguides 12 arranged side by side, a first slab waveguide 13 connected to the output ends of the optical input waveguides 12, an arrayed waveguide 14 connected to the output end of the first slab waveguide 13, a second slab waveguide 15 connected to the output end of the arrayed waveguide 14, and a plurality of optical output waveguides 16 arranged side by side and connected to the output end of the second slab waveguide 15.

The arrayed waveguide 14 propagates light that is output from the first slab waveguide 13, and is a plurality of channel waveguides 14a arranged side by side. Lengths of adjacent channel waveguides 14a are different from each other with the differences (ΔL) preset. The optical input waveguides 12 and the optical output waveguides 16 have the same dimensions.

The number of optical output waveguides 16 is determined, for example, in accordance with how many light beams having different wavelengths from one another are to be created as a result of demultiplexing of signal light by the arrayed waveguide grating type optical multiplexer/demultiplexer. The channel waveguides 14a constituting the arrayed waveguide 14 are usually provided in a large number, for example 100. However, FIG. 19A is simplified and the numbers of the channel waveguides 14a, the optical output waveguides 16, and the optical input waveguides 12 in FIG. 19A do not reflect the actual numbers thereof.

FIG. 19B schematically shows an enlarged view of an area of FIG. 19A surrounded by the chain line A. As shown in FIG. 19B, in the arrayed waveguide grating type optical multiplexer/demultiplexer of the background art, straight output ends of the optical input waveguides 12 are connected directly to the input end of the first slab waveguide 13. Similarly, the straight entrance ends of the optical output waveguides 16 are connected directly to the output end of the second slab waveguide 15.

The optical input waveguides 12 are connected to, for example, transmission side optical fibers (not shown), so that light having undergone the wavelength division multiplexing is introduced to the optical input waveguides 12. The light, after traveling through the optical input waveguides 12 and being introduced to the first slab waveguide 13, is diffracted by the diffraction effect thereof and is input to the arrayed waveguide 14 to travel along the arrayed waveguide 14.

After traveling through the arrayed waveguide 14, the light reaches the second slab waveguide 15 and then is condensed at the output end of the second slab waveguide 15. Because of the preset differences in lengths between adjacent channel waveguides 14a of the arrayed waveguide 14, light beams after traveling through the arrayed waveguide 14 have different phases from one another. The phase fronts of many light beams from the arrayed waveguide 14 are tilted in accordance with this difference and the each position where the each light beam is condensed is determined by the angle of this tilt. Therefore, the light beams having different wavelengths are condensed at different positions from one another. By forming the optical output waveguides 16 at these positions, the light beams having different wavelengths can be output from their respective optical output waveguides 16 provided for the different respective wavelengths.

For instance, as shown in FIG. 19A, light beam having undergone the wavelength division multiplexing and having wavelengths of $\lambda 1, \lambda 2, \lambda 3, \ldots, \lambda n$ (n is an integer equal to or larger than 2) is input to one of the optical input waveguides 12. The light beam is diffracted in the first slab waveguide 13, reach the arrayed waveguide 14, and travel through the arrayed waveguide 14 and the second slab waveguide 15. Then, as described above, the light beams are respectively condensed at different positions determined by their wavelengths, enter different optical output waveguides 16, travel along their respective optical output waveguides 16, and are output from the output ends of the respective optical output waveguides 16. The light beams having different wavelengths are output through optical fibers (not shown) connected to the output ends of the optical output waveguides 16.

In this arrayed waveguide grating type optical multiplexer/demultiplexer, an improvement in wavelength resolution of a grating is in proportion to the differences in lengths (ΔL) between the adjacent channel waveguides 14a of the arrayed waveguide 14. When the optical multiplexer/demultiplexer is designed to have a large ΔL, it is possible to multiplex/demultiplex light to accomplish wavelength division multiplexing with a narrow wavelength interval. However, in the background art there are limits to how narrow a wavelength interval can be multiplexed. The optical multiplexer/demultiplexer has a function of multiplexing/demultiplexing a plurality of signal light beams. A function of demultiplexing or multiplexing a plurality of optical signals with a wavelength interval of 1 nm or less is deemed necessary for optical wavelength division multiplexing communications of high density.

In order for the above arrayed waveguide grating type optical multiplexer/demultiplexer to practice the second desired capability of the optical multiplexer/demultiplexer, i.e., to achieve central wavelength flatness, and to broaden the 3 dB band width (3 dB pass band width) of optical central wavelengths output from the optical output waveguides 16, an arrayed waveguide grating type optical multiplexer/demultiplexer having a structure as shown in FIGS. 20A and 20B has been proposed. This arrayed waveguide grating type optical multiplexer/demultiplexer proposed has, as shown in FIG. 20A, substantially the same structure as the background arrayed waveguide grating type optical multiplexer/demultiplexer illustrated in FIG. 19A except that, and as shown in FIGS. 20B and 21, the output ends of the optical input waveguides 12 have a different structure.

The arrayed waveguide grating type optical multiplexer/demultiplexer of FIGS. 20A and 20B is disclosed in Japanese Patent Application Laid-open No. Hei 8-122557. In this arrayed waveguide grating type optical multiplexer/demultiplexer, a slit-like waveguide 50 is formed at the output end of each of the optical input waveguides 12. The slit-like waveguide 50 has, as shown in FIG. 21, a tapered waveguide portion 2A whose width gradually increases with a taper angle θ. The tapered waveguide portion 2A has at its center a trapezoidal slit 19, so that two narrow waveguide portions $8_1$, $8_2$ which are spaced apart from each other are formed. The distance between the narrow waveguide portions $8_1$, $8_2$ is gradually increased toward the first slab waveguide 13 in FIG. 21, with the left-hand distance labeled as CW and the right-hand distance labeled as SW.

According to this proposed arrayed waveguide grating type optical multiplexer/demultiplexer as disclosed in Japanese Patent Application Laid-open (Kokai) No. Hei 8-122557, the 3 dB band width of light to be multiplexed and demultiplexed by the arrayed waveguide grating type optical multiplexer/demultiplexer can be broadened. This can be confirmed by, for example, loss wavelength characteristics shown in FIG. 22.

Other waveguide structures for arrayed waveguide grating type optical multiplexers/demultiplexers have also been proposed. One such other waveguide structure, as shown in FIG. 23, has a parabolic tapered waveguide 20 connected to the output end of each of the optical input waveguides 12. Another waveguide structure as shown in FIG. 24, has a multi-mode interface waveguide 21 connected to the output end of each of the optical input waveguides 12.

The structure shown in FIG. 23 is the structure of an arrayed waveguide grating proposed by NTT in Japanese Patent Application Laid-open (Kokai) No. Hei 9-297228. The structure shown in FIG. 24 is a structure proposed by Bell Communication Research Inc. in U.S. Pat. No. 5,629,992 titled "Passband Flattening of Integrated Optical Filters".

However, the structure of the arrayed waveguide grating type optical multiplexer/demultiplexer having the slit-like waveguide 50 as shown in FIGS. 20A, 20B, and 21 is not simple and, hence, a problem arises in that variations in production are likely to result, and accordingly variations in abilities result. In addition, although this arrayed waveguide grating type optical multiplexer/demultiplexer does broaden the 3 dB band width, when the 3 dB band width is broadened in order to widen the 1 dB band width which is another measure of the wavelength flatness, ripple (see, for example, area B in FIG. 22), which is yet another measure of the wavelength flatness, is increased. It is also found that the 1 dB band width is divided into two at this ripple resulting in a narrowed 1 dB band width, and that the adjacent crosstalk, which is the third desired capability of the optical multiplexer/demultiplexer, is degraded.

SUMMARY OF THE INVENTION

The present invention has been made to address the above and other problems in the background art, and an object of the present invention is therefore to provide an arrayed waveguide grating type optical multiplexer/demultiplexer in which the 1 dB band width is wide, the ripple is small, the adjacent crosstalk is low, and the production yield is high.

To achieve the above and other objects, the present invention is directed to an optical waveguide which may be utilized in an array waveguide grating optical multiplexer/demultiplexer. According to the present invention, the optical waveguide is a single mode waveguide and a multi-mode waveguide configured to realize multi-mode and connected to the single mode waveguide. The multi-mode waveguide is a multi-mode broadening waveguide which has a width which increases toward the direction toward the arrayed waveguide. The multi-mode broadening waveguide may have a trapezoidal shape and may be connected to a constant width waveguide which has the same width as that of the upper base of a trapezoidal waveguide. Further, the multi-mode waveguide itself may include a constant width waveguide which is connected to the single mode waveguide.

Thus, to achieve the above and other objects, the present invention places a multi-mode waveguide whose width increases toward an arrayed waveguide, such as a trapezoidal waveguide on an output end of an optical input waveguide, for example. The present invention thus can provide an arrayed waveguide grating type optical multiplexer/demultiplexer in which the 1 dB band width is wide, ripple is small, and adjacent crosstalk is low.

A straight waveguide narrower than the optical input waveguide may be placed between, for example, the optical input waveguide and the trapezoidal waveguide. Because of this straight waveguide, if the optical input waveguide has a curved portion and the central position of the light intensity distribution is deviated from the center in width of the optical input waveguide after the light has traveled through this curved portion, the central position of the light intensity distribution can be moved to the center of the straight waveguide as the light travels along the straight waveguide. The light intensity center thus can be input in the center in width of the trapezoidal waveguide.

The arrayed waveguide grating type optical multiplexer/demultiplexer is also formed by utilizing the reciprocity of an optical circuit. It is therefore possible to obtain an arrayed waveguide grating type optical multiplexer/demultiplexer in which the 1 dB band width is wide, the ripple is small, and the adjacent crosstalk is low also in the case in which a multi-mode waveguide having in at least a part thereof a waveguide whose width increases toward the arrayed waveguide is connected to the input end of each of the optical output waveguides. An example of such a waveguide with increasing width is a trapezoidal waveguide which is wider than the optical output waveguides and the width of which increases toward the arrayed waveguide.

The present invention described above does not have a complicated structure, but is simple. Therefore, manufacturing thereof is easy and it makes an arrayed waveguide grating type optical multiplexer/demultiplexer with high production yield.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Embodiments of the present invention will be described below with reference to the drawings. In the description of the embodiments, the same reference symbols are used to denote components having the same names as those in the background examples, and explanations thereof will not be repeated.

Figure 20A:
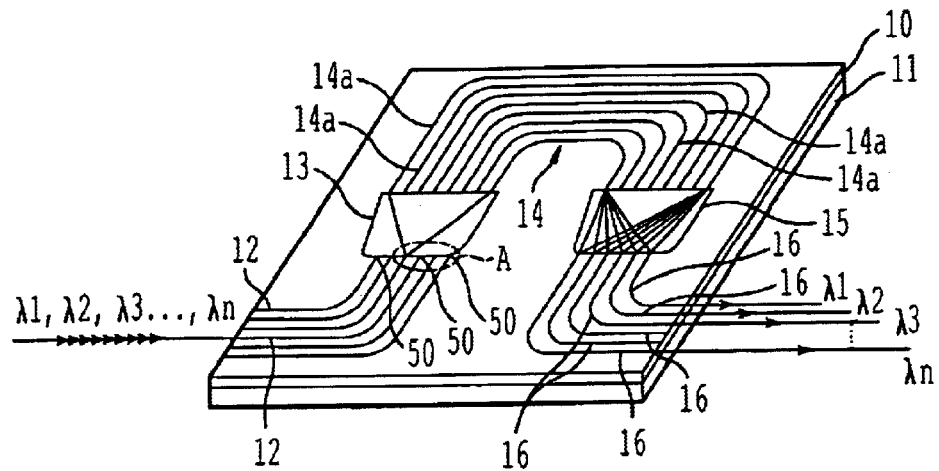
FIGS. 20A and 20B are explanatory diagrams showing an example of a background arrayed waveguide grating type optical multiplexer/demultiplexer.
Figure 20B:
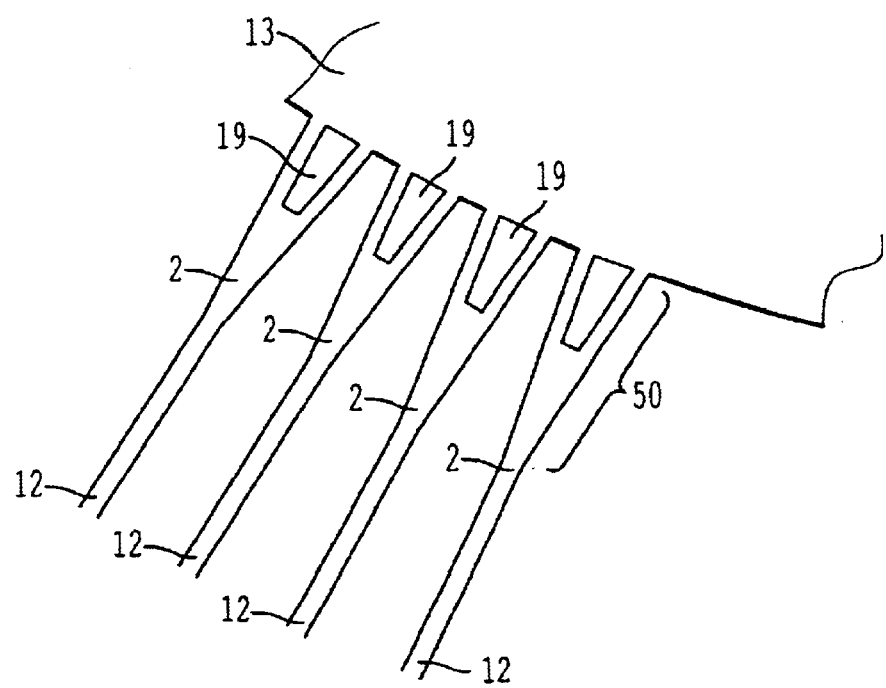
Figure 21:
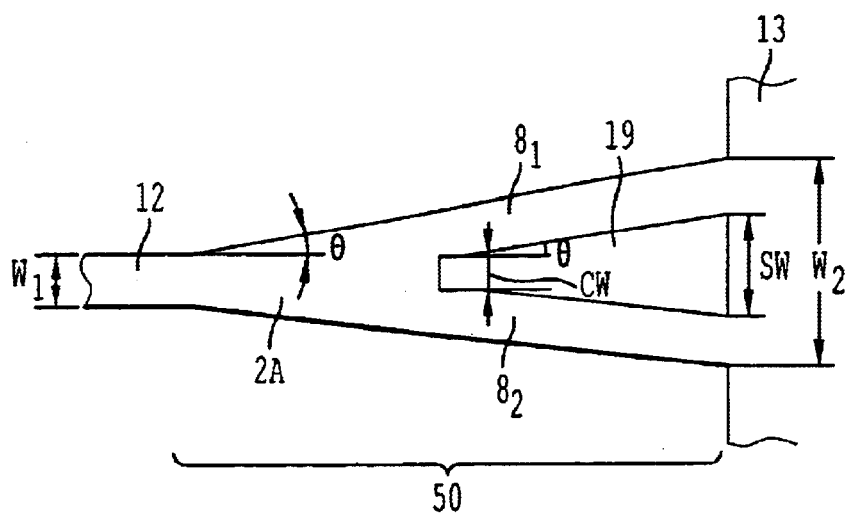
FIG. 21 is an explanatory diagram showing the structure of the output end of an optical input waveguide in the arrayed waveguide grating type optical multiplexer/demultiplexer shown in FIGS. 20A and 20B.
Figure 22:
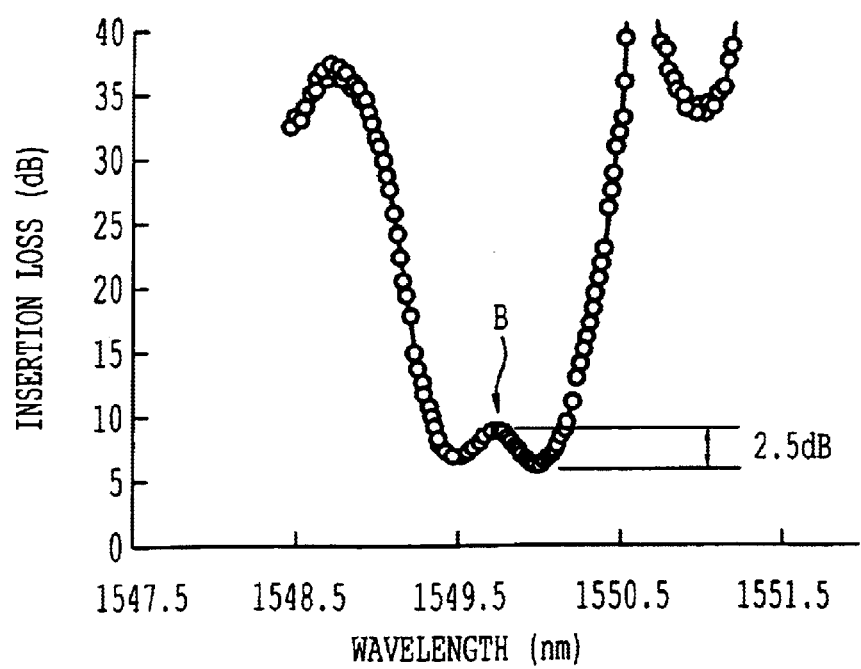
FIG. 22 is a graph showing wavelength loss characteristics of the arrayed waveguide grating type optical multiplexer/demultiplexer shown in FIGS. 20A and 20B.

As discussed above, the background art has already disclosed arrayed waveguide grating type optical multiplexers/demultiplexers such as shown for example in FIGS. 19–24. However, each of those background arrayed waveguide grating type multiplexers/demultiplexers suffers from drawbacks as discussed above. One drawback with respect to the device of FIGS. 20 and 21 is that the manufacture of the slit-like waveguides 50 is difficult because of their structure, and it is particular difficult to consistently manufacture precise slit-like waveguides 50.

The present inventors have experimentally manufactured five arrayed waveguide grating type optical multiplexers/demultiplexers in order to investigate characteristics of the arrayed waveguide type gratings having the slit-like waveguide 50 shown in FIG. 21. Each of these experimentally-manufactured arrayed waveguide grating type optical multiplexers/demultiplexers have the following values for the lengths W2, CW, and SW and the angle θ in FIG. 21 and for the relative refractive index difference of the arrayed waveguide type gratings.

In the experimentally-manufactured arrayed waveguide grating type optical multiplexers/demultiplexers, variables as shown in FIG. 21 were set as follows: the waveguide width W1 of each of the optical input waveguides 12=6.5 μm; the taper angle θ of the tapered waveguide portion 2A=0.4°; the distance CW between the narrow waveguide portions 8 at the junction between the tapered waveguide portion 2A and the narrow waveguide portions 8=2.0 μm; the distance SW between the narrow waveguide portions 8 at the junction between the narrow waveguide portions 8 and the first slab waveguide 13=4.0 μm; and the width W2 of the junction between the slit-like waveguide 50 and the first slab waveguide 13=15.0 μm.

According to the publication Japanese Patent Application Laid-open No. Hei 8-122557, the condition for broadening the 3 dB band width is to set the ratio of the distance SW to the width W2, namely SW/W2, from 0.2 to 0.6. Therefore, the ratio of the distance SW to the width W2, SW/W2, was set so as to meet this condition in the experimentally-manufactured arrayed waveguide grating type optical multiplexer/demultiplexers.

In the experimentally-manufactured arrayed waveguide grating type optical multiplexer/demultiplexers, all the waveguides have the same height of 6.5 μm, the relative refractive index difference was set to 0.8%, and the frequency was set to 100 GHz (an interval of about 0.8 nm in the 1.55 μm band). The present inventors then investigated characteristics of these experimentally-manufactured arrayed waveguide type gratings, and the results of that investigation are shown in Table 1.

TABLE 1

|  | 3 dB band width (nm) | 1 dB band width (nm) | Ripple (dB) | Adjacent Crosstalk (dB) |
| --- | --- | --- | --- | --- |
| Sample 1 | 0.59 | 0.20 | 1.4 | −17 |
| Sample 2 | 0.56 | 0.42 | 0.6 | −23 |
| Sample 3 | 0.51 | 0.38 | 0.7 | −25 |
| Sample 4 | 0.63 | 0.22 | 1.5 | −15 |
| Sample 5 | 0.50 | 0.35 | 0.5 | −26 |

In Table 1, the adjacent crosstalk is the difference between loss at the optical transmission center wavelength (hereinafter referred to as a "central wavelength") and best loss in the adjacent wavelength range of ±(0.8±0.1) mu of the passing band.

As is apparent from Table 1, in spite of the slit-like waveguides 50 from each sample being designed to have the same size, the five arrayed waveguide grating type optical multiplexers/demultiplexers (Samples 1 to 5) greatly fluctuated in their capabilities. This is because the actual size of the manufactured slit-like waveguides 50 varied among the five arrayed waveguide grating type optical multiplexers/demultiplexers, since it was difficult to precisely manufacture such small dimensional waveguides. That is, when manufacturing the five arrayed waveguide grating type optical multiplexers/demultiplexers, high precision could not be achieved, due to the smallness of the specific structures sought to be manufactured. The sample having a larger 3 dB band width had a larger ripple, and the adjacent crosstalk thereof was degraded more than the others. In Samples 1 and 4, the degree of ripple exceeded 1 dB, and the 1 dB band width was thus divided, narrowing the 1 dB band width.

In general, according to the desired capabilities of an optical multiplexer/demultiplexer which are demanded by wavelength division multiplexing transmission systems, 1 dB band width should be 0.3 to 0.4 nm or more, the ripple should be 0.5 dB or less, and the adjacent crosstalk should be −26 dB or less. Then, if such a standard is set, for example, such that the 1 dB band width is 0.35 nm or more, the ripple is 0.5 dB or less, and the adjacent crosstalk is −26 dB or less, four samples out of Samples 1 to 5 in Table 1 would be deemed as inferior products and the acceptable yield would only be ⅕. If this standard is modified so that the 1 dB band width is 0.4 nm or more, all of Samples 1 to 5 in Table 1 are unacceptable.

In view of the above, the present inventors have conducted a simulation, seeking a structure of an arrayed waveguide grating type optical multiplexer/demultiplexer which satisfies the first to third desired capabilities of the optical multiplexer/demultiplexer. In the simulation, the arrayed waveguide grating type optical multiplexer/demultiplexer structured as shown in FIG. 21 was used, and the electric field amplitude distribution (optical amplitude) of light that is output from the output end of the slit-like waveguide 50 to enter the first slab waveguide 13 has been simulated using a known beam propagation method. From the results of the simulation, the following ideas have been obtained.

Figure 25:
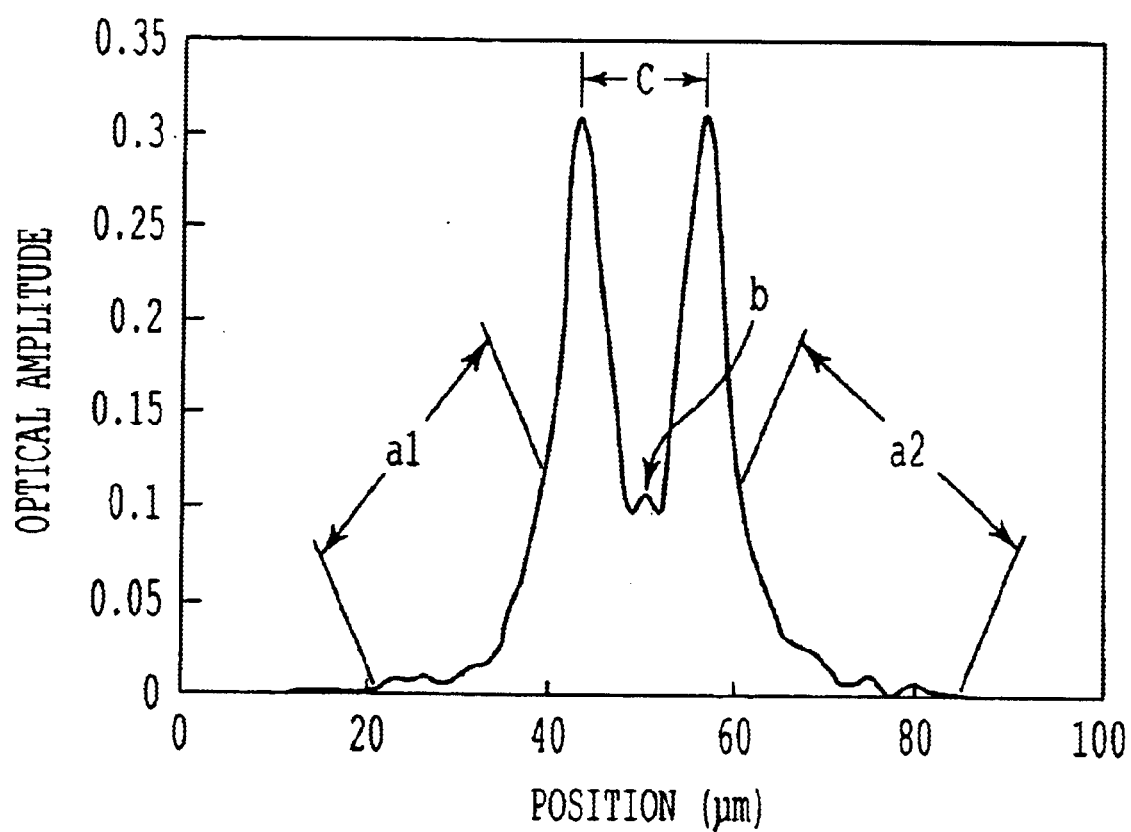
FIG. 25 is a graph showing optical amplitude distribution of light at the output end of a slit-like waveguide according to the structure shown in FIGS. 20A, 20B, and 21.

The simulated optical amplitude distribution has two peaks as shown in FIG. 25, and when a distance c between the two peaks is increased, the 3 dB band width is broadened. The 3 dB band width therefore greatly changes in accordance with the change in the distance c. The ripple is increased when a valley portion b between the two peaks (a part about the center of the optical amplitude distribution) is deepened. The inventors also found that as the distance c is increased, the valley portion b is naturally deepened. The broadened 3 dB band width increases the ripple, and if the ripple exceeds, for example, more than 1 dB, the 1 dB band width is divided, narrowing the 1 dB band width.

As a consequence, in the background structures shown in FIGS. 20A, 20B, and 21, if the designs allow the distance c to be large, the 3 dB band width can be broadened but the ripple is undesirably increased to thereby narrow the 1 dB band width.

The present inventors have also inferred that the degradation of the adjacent crosstalk is caused under the influence of gentle base portions a1 and a2.

Based on this inference, the present inventors have thought of a way to broaden the 1 dB band width, reduce the ripple, and control the degradation of the adjacent crosstalk. Specifically, the present inventors have determined that a beneficial result can be realized if the optical amplitude distribution of light that is output from the optical input waveguide of the arrayed waveguide grating type optical multiplexer/demultiplexer to enter the first slab waveguide matches, at the entrance of the first slab waveguide, the shape of the following optical amplitude distribution.

That is, the above effect can be obtained if the optical amplitude distribution of light that is about to enter the first slab waveguide has a shape in which the valley portion b in FIG. 25 is shallow, the distance c (distance between the peaks on both ends) in FIG. 25 is large, and there are no gentle base portions a1, a2 as shown in FIG. 25.

The present inventors have also found that, in the structure shown in FIG. 21, a large width of and a large distance between the two narrow waveguide portions 8 particularly influences the fluctuations of the 1 dB band width, the ripple, and the adjacent crosstalk to a great degree. Accordingly, the present inventors determined that a preferable structure for an optical waveguide circuit on the output end of the optical input waveguide is one having a waveguide structure that does not include the slit as shown in FIG. 21.

Figure 23:
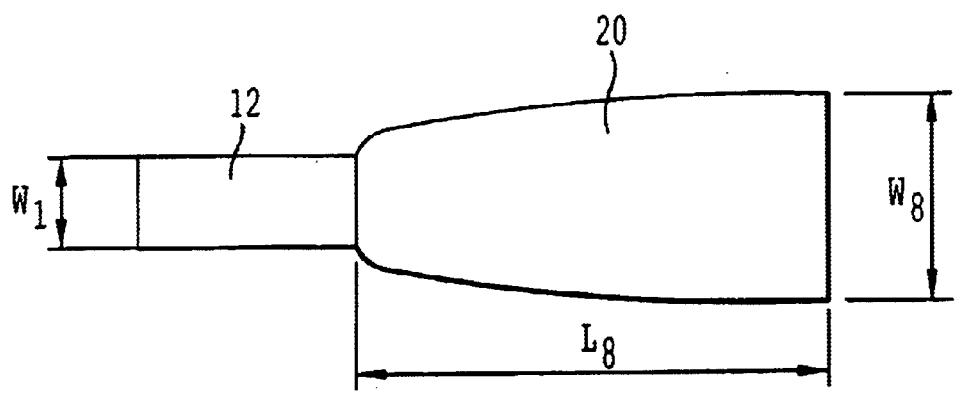
FIG. 23 is an explanatory diagram showing the structure of the output end of an optical input waveguide according to a background arrayed waveguide grating type optical multiplexer/demultiplexer.
Figure 24:
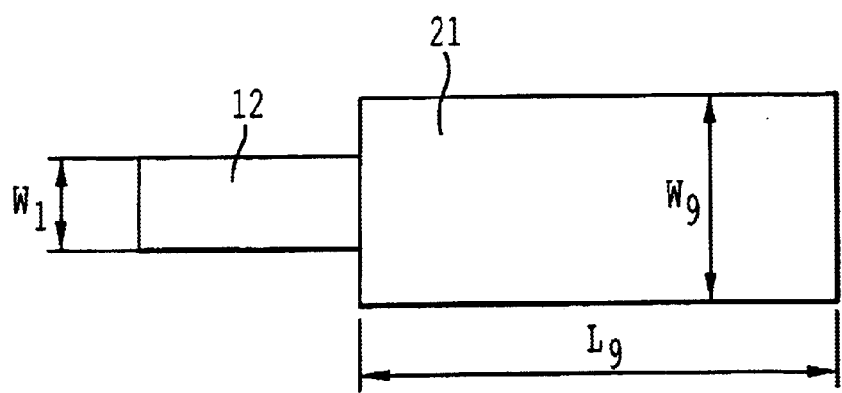
FIG. 24 is an explanatory diagram showing another example of the structure of the output end of an optical input waveguide according to a background arrayed waveguide grating type optical multiplexer/demultiplexer.

The present inventors also obtained the optical amplitude distribution for the background examples, shown in FIGS. 23 and 24, through simulation using the beam propagation method. In this simulation, the width W1 of each of the optical input waveguides 12 was set to 6.5 $\mu$m, a length L8 of the parabolic tapered waveguide 20 was set to 900 $\mu$m, a width W8 of an output end of the parabolic tapered waveguide 20 was set to 50 $\mu$m, a length L9 of the multi-mode interface waveguide 21 was set to 500 $\mu$m, and a width W9 of the multi-mode interface waveguide 21 was set to 25 $\mu$m.

Figure 26:
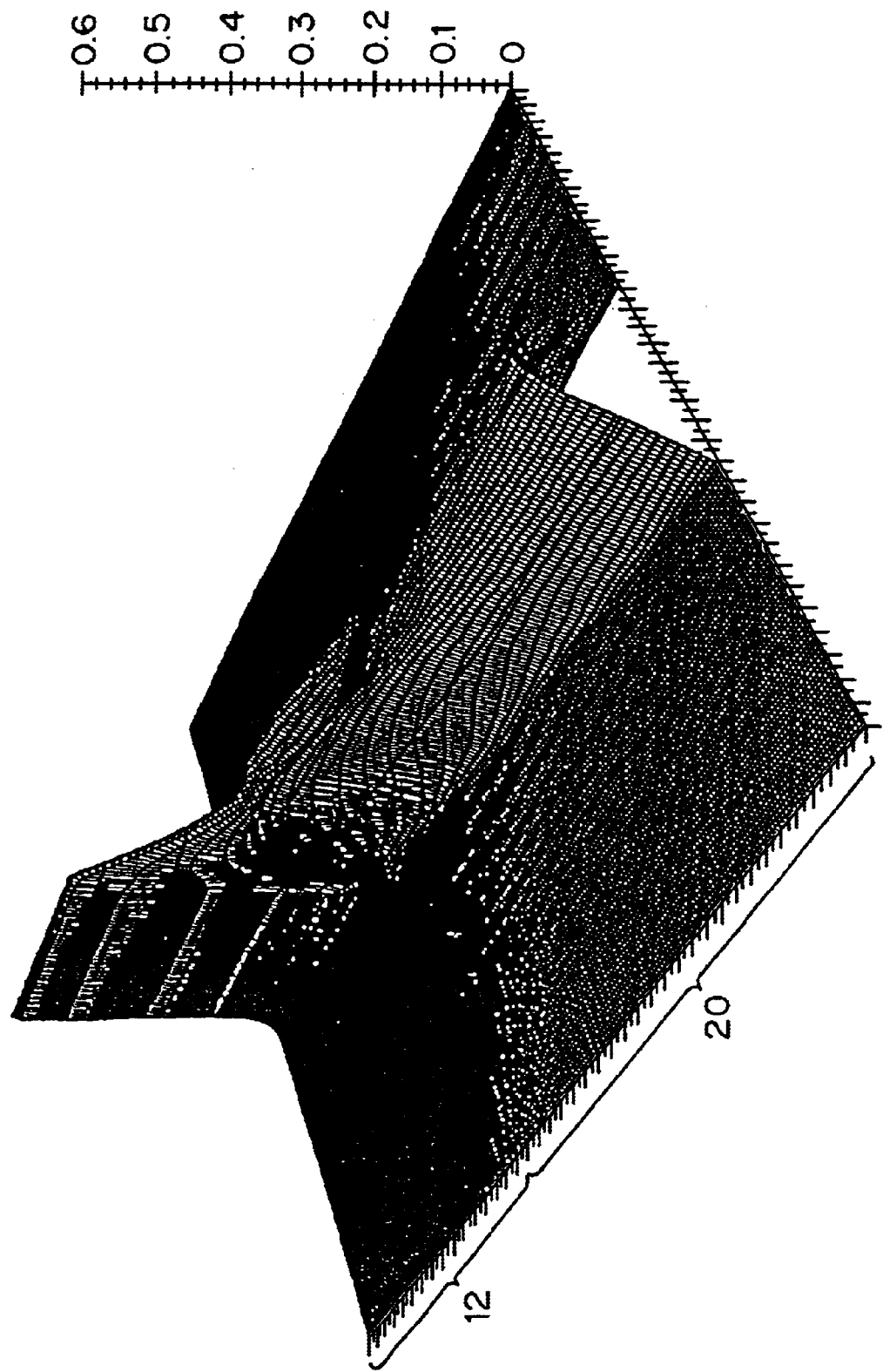
FIG. 26 is an explanatory diagram showing three-dimensionally the results of a simulation of optical amplitude distribution of light that travels along the optical input waveguide and a parabolic tapered waveguide according to the structure shown in FIG. 23.
Figure 27:
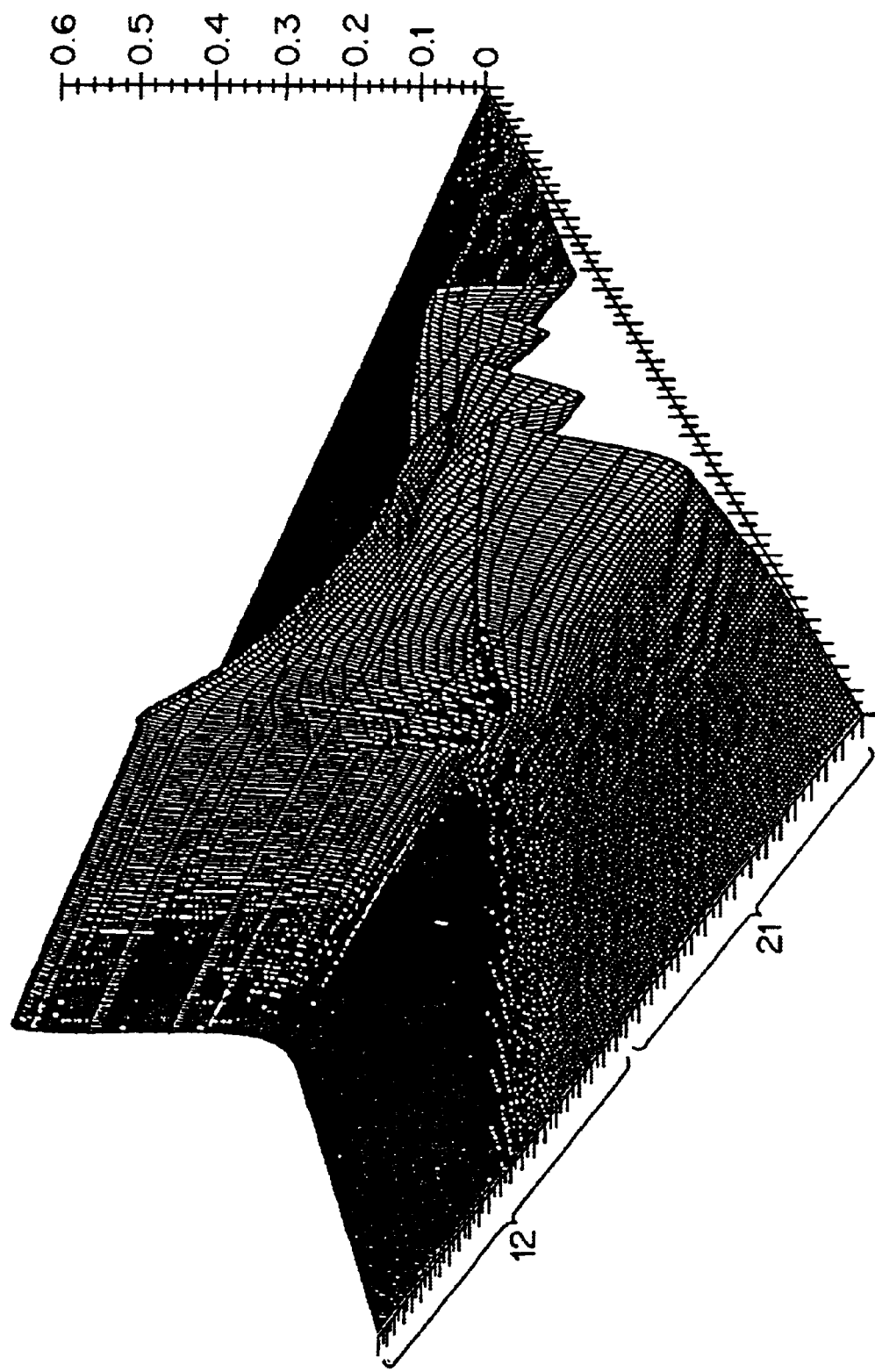
FIG. 27 is an explanatory diagram showing three-dimensionally the results of a simulation of optical amplitude distribution of light that travels along the optical input waveguide and a multi-mode interface waveguide according to the structure shown in FIG. 24.

As a result, the optical amplitude distribution in the structure shown in FIG. 23 is as shown in FIG. 26, and the optical amplitude distribution in the structure shown in FIG. 24 is as shown in FIG. 27.

Figure 28:
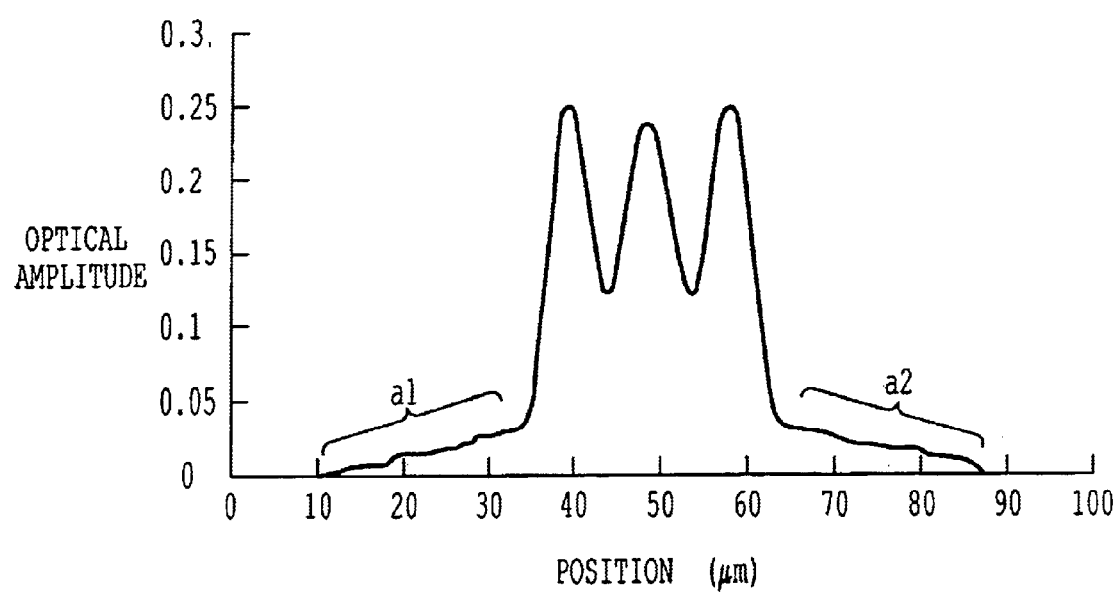
FIG. 28 is a graph showing optical amplitude distribution of light at the output end of the multi-mode interface waveguide according to the structure shown in FIG. 24.

The optical amplitude distribution in the structure having the parabolic tapered waveguide 20 has its peaks reduced from two to one, as shown in FIG. 26. On the other hand, optical amplitude distribution of light in the structure having the multi-mode interface waveguide 21 has three peaks at the output end of the multi-mode interface waveguide 21, as shown in FIG. 27. This shape, however, was found to be ineffective in terms of rising of the base portions a1 and a2, as shown in FIG. 28.

Furthermore, the parabolic tapered waveguide 20 is found to be difficult to form exactly as designed because its oblique lines are curved. This makes the production yield poor.

The present inventors thus also concluded that both of the proposed structures shown in FIGS. 23 and 24 could not satisfy the first to third desired capabilities of the optical multiplexer/demultiplexer.

In order to structure an arrayed waveguide grating type optical multiplexer/demultiplexer in which the 1 dB band width is wide, the ripple is small, and the adjacent crosstalk is low, the present inventors have conducted a variety of investigations while focusing on the structure of the junction between the optical input waveguides and the first slab waveguide.

Figure 5:
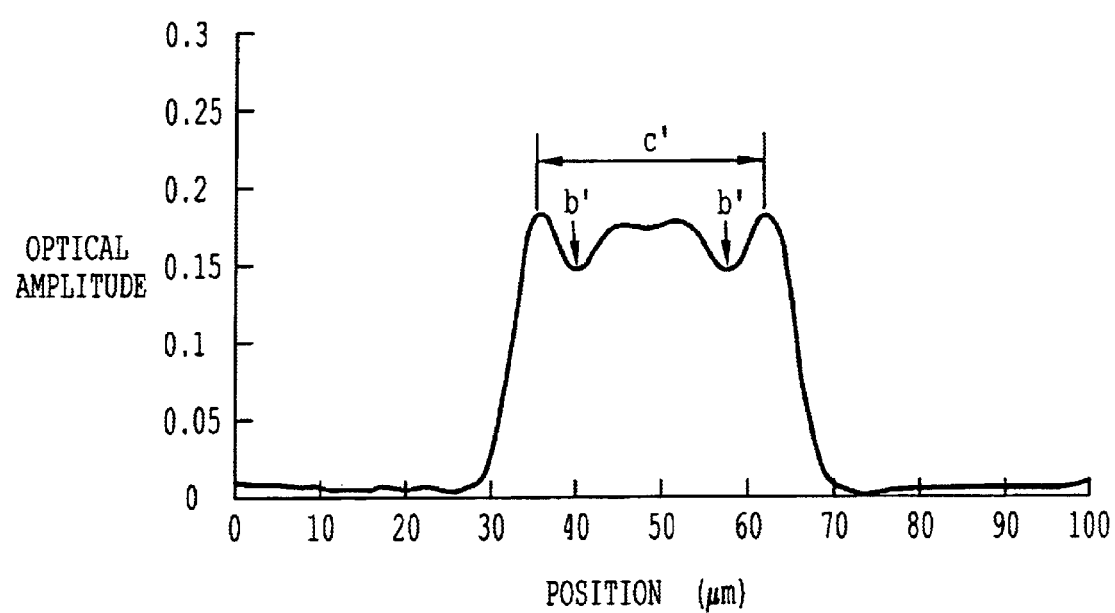
FIG. 5 is a graph showing optical amplitude distribution of light at the output end of the trapezoidal waveguide in the first embodiment.

As a result of the investigations, the present inventors have found a way to obtain a preferable optical amplitude distribution of light that is output from the optical input waveguide to enter the first slab waveguide. The preferable optical amplitude distribution, in which a distance c' between peaks is large, a valley portion b' is shallow, and base portions are cut off, as shown in FIG. 5, is obtained by connecting a multi-mode waveguide which is wide enough to realize multi-mode to the output end(s) of at least one or more optical input waveguides and by forming a waveguide whose width increases toward the arrayed waveguide in at least a part of the multi-mode waveguide.

More specifically, for instance, a trapezoidal waveguide whose width increases toward the first slab waveguide is connected to the output end of the optical input waveguide, and the upper base (the side facing the optical input waveguide) of the trapezoidal waveguide is wider than the width of the optical input waveguides so that the trapezoidal waveguide is wider than the optical input waveguide along its entire length. This makes it possible to form the optical amplitude distribution of light that is output from the optical input waveguide to enter the first slab waveguide into a shape, for example, as shown in FIG. 5 at the entrance of the first slab waveguide.

The present inventors consider that the following is the mechanism of this effect. By setting the normalized frequency upon the entrance of light into the trapezoidal waveguide to 2.4 or more, the light is broadened along the width of the trapezoidal waveguide as a multi-mode optical amplitude distribution. The light is then propagated along the trapezoidal waveguide while changing the optical amplitude distribution. Because the width of the trapezoidal waveguide is increased toward the arrayed waveguide, the light travels while cutting off the base portions of the optical amplitude distribution (improving the rising of the base portions) and increasing the distance c' between the peaks of the optical amplitude distribution.

Based on the above investigations, the present invention places the multi-mode waveguide whose width increases toward the arrayed waveguide, such as the trapezoidal waveguide described above, on the output end of the optical input waveguides, for example. This makes it possible to form the optical amplitude distribution of light that is output from the optical input waveguide to enter the first slab waveguide into a shape, for example, as shown in FIG. 5 at the entrance of the first slab waveguide. In the obtained optical amplitude distribution of light, the distance c' between the peaks on its both ends is large, and there are no gentle base portions a1, a2 as shown in FIG. 25. The present invention thus can provide an arrayed waveguide grating type optical multiplexer/demultiplexer in which the 1 dB band width is wide, the ripple b' is small, and the adjacent crosstalk is low.

A straight waveguide narrower than the optical input waveguide may be placed between, for example, the optical input waveguide and the trapezoidal waveguide. Because of this straight waveguide, if the optical input waveguide has a curved portion and the central position of the light intensity distribution is deviated from the center in width of the optical input waveguide after the light has traveled through this curved portion, the central position of the light intensity distribution can be moved to the center of the straight waveguide as the light travels along the straight waveguide. The light intensity center thus can be input in the center in width of the trapezoidal waveguide.

The arrayed waveguide grating type optical multiplexer/demultiplexer is formed by utilizing the reciprocity of an optical circuit. It is therefore possible to obtain an arrayed waveguide grating type optical multiplexer/demultiplexer in which the 1 dB band width is wide, the ripple is small, and the adjacent crosstalk is low also in the case in which a multi-mode waveguide having in at least a part thereof a waveguide whose width increases toward the arrayed waveguide is connected to the input end of each of the optical output waveguides. An example of such a waveguide with increasing width is a trapezoidal waveguide which is wider than the optical output waveguides and the width of which increases toward the arrayed waveguide.

The present invention described above does not have a complicated structure as shown in FIG. 21 but is simple. Therefore, manufacturing thereof is easy and it makes an arrayed waveguide grating type optical multiplexer/demultiplexer with high production yield.

Figure 1A:
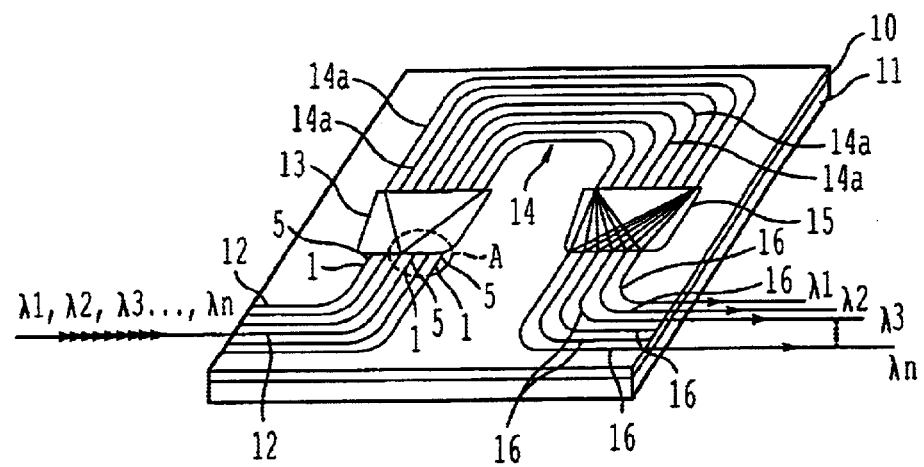
FIGS. 1A and 1B are structural diagrams schematically showing a first embodiment of an arrayed waveguide grating type optical multiplexer/demultiplexer according to the present invention.
Figure 1B:
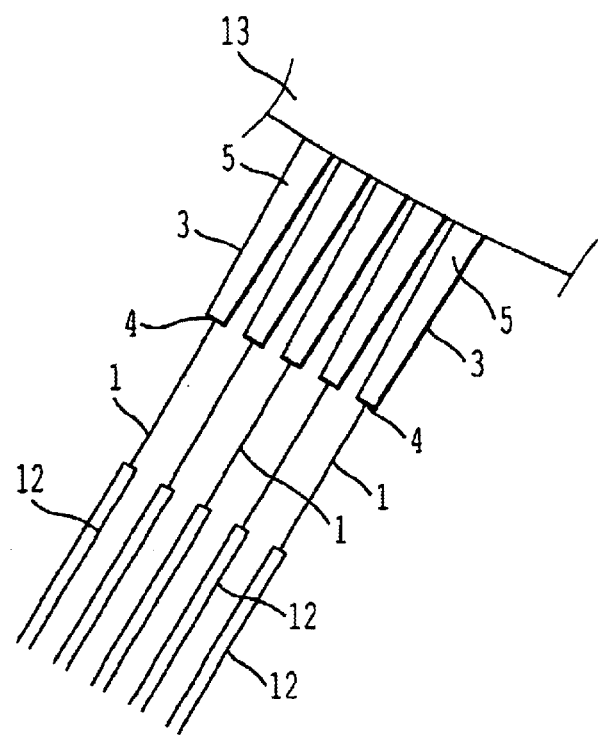
Figure 2:
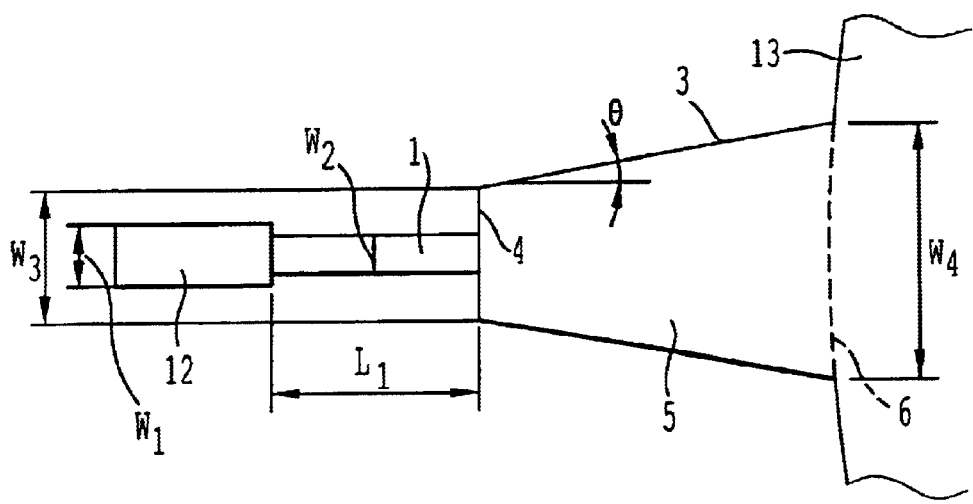
FIG. 2 is an explanatory diagram showing specifics of the structure of the output end of an optical input waveguide according to the first embodiment.

FIG. 1A schematically shows the structure and the operation of the main part of the first embodiment of an arrayed waveguide grating type optical multiplexer/demultiplexer according to the present invention. FIG. 1B is an enlarged view of an area surrounded by the broken line A in FIG. 1A. FIG. 2 further shows specifics of an end of one of optical input waveguides 12 in the enlarged view of FIG. 1B.

FIG. 1A shows that this first embodiment is structured similarly as the background art arrayed waveguide grating shown in FIGS. 19A, 19B, 20A and 20B. This first embodiment differs from the background art in that, and as shown most clearly in FIGS. 1B and 2, a straight waveguide (narrow straight waveguide) 1 narrower than the optical input waveguides 12 is connected to the output end of each of the optical input waveguides 12, and in that a trapezoidal waveguide 5 which is wider than the optical input waveguides 12 and which has a width which increases toward a first slab waveguide 13 is connected to the output end of each straight waveguide 1. Oblique lines 3 of the trapezoidal waveguide 5 are substantially straight.

As shown in FIG. 2, the trapezoidal waveguide 5 of the present invention has a first or an upper base 4 (with a first width W3) that is wider than the width (W1) of its associated one of the optical input waveguides 12. The width of the trapezoidal waveguide 5 increases at a taper angle θ. This structure makes the trapezoidal waveguide 5 wider than its associated one of the optical input waveguides 12 along the entire length of the trapezoidal waveguide 5. A second or a lower base 6 of the trapezoidal waveguide 5 is slightly curved and the width of the trapezoidal waveguide 5 at the lower base 6 is W4 (a second width).

In the structure of the optical waveguide circuit shown in FIG. 2, each trapezoidal waveguide 5 is connected via the straight waveguide 1 to the output end of the respective optical input waveguides 12 as single mode waveguides. The trapezoidal waveguide 5 functions as a multi-mode waveguide which is wide enough to realize multi-mode, and also functions as a multi-mode broadening waveguide whose width increases toward a direction of the light traveling forward.

The center in width of each straight waveguide 1 is positioned so as to coincide with the center in width of the input end 4 (upper base) of its associated trapezoidal waveguide 5. Each straight waveguide 1 shifts the power center of an optical signal that has traveled through one of the optical input waveguides 12 to which the straight waveguide 1 is connected to the center in width of the straight waveguide 1, thereby entering the power center of the optical signal to the center in width of the input end 4 of the trapezoidal waveguide 5. The width of the straight waveguide 1 is W2 and the length thereof is L1.

In this first embodiment, the parameters above may be set as follows: the width W1 of each of the optical input waveguides 12=6.5 $\mu$m; the width W2 of the straight waveguide 1=3.0 $\mu$m; the length L1 of the straight waveguide 1=500 $\mu$m; the width W3 of the trapezoidal waveguide 5 at the upper base 4=20.0 $\mu$m; the taper angle θ=0.4°, and the width W4 of the trapezoidal waveguide 5 at the lower base 6=35.0 $\mu$m. The arrayed waveguide grating type optical multiplexer/demultiplexer in this first embodiment has a function of multiplexing and demultiplexing light with a wavelength interval of about 0.8 nm (in other words, with a frequency of 100 GHz) in a 1.55 $\mu$m band.

The first embodiment is thus structured. In this first embodiment also, similar to the background arrayed waveguide grating, the optical input waveguides 12 are connected to, for example, transmission side optical fibers (not shown) so that light that has undergone wavelength division multiplexing is introduced to the optical input waveguides 12. However, the light that has traveled through the optical input waveguides 12 in this first embodiment enters the straight waveguide 1, and the optical power center thereof is shifted to the center of the straight waveguide 1, to thereby enter the optical power center to the center in width of the trapezoidal waveguide 5.

By setting the normalized frequency (V value) to 2.4 or more, the light input to the trapezoidal waveguide 5 is broadened along the width of the waveguide as a multi-mode optical amplitude distribution. The light then travels along the trapezoidal waveguide 5 while changing its optical amplitude distribution. Because the width of the trapezoidal waveguide 5 increases toward the first slab waveguide 13, base portions in the optical amplitude distribution are cut off as the light travels, and the optical amplitude distribution gradually increases the distribution width as a whole.

Figure 4:
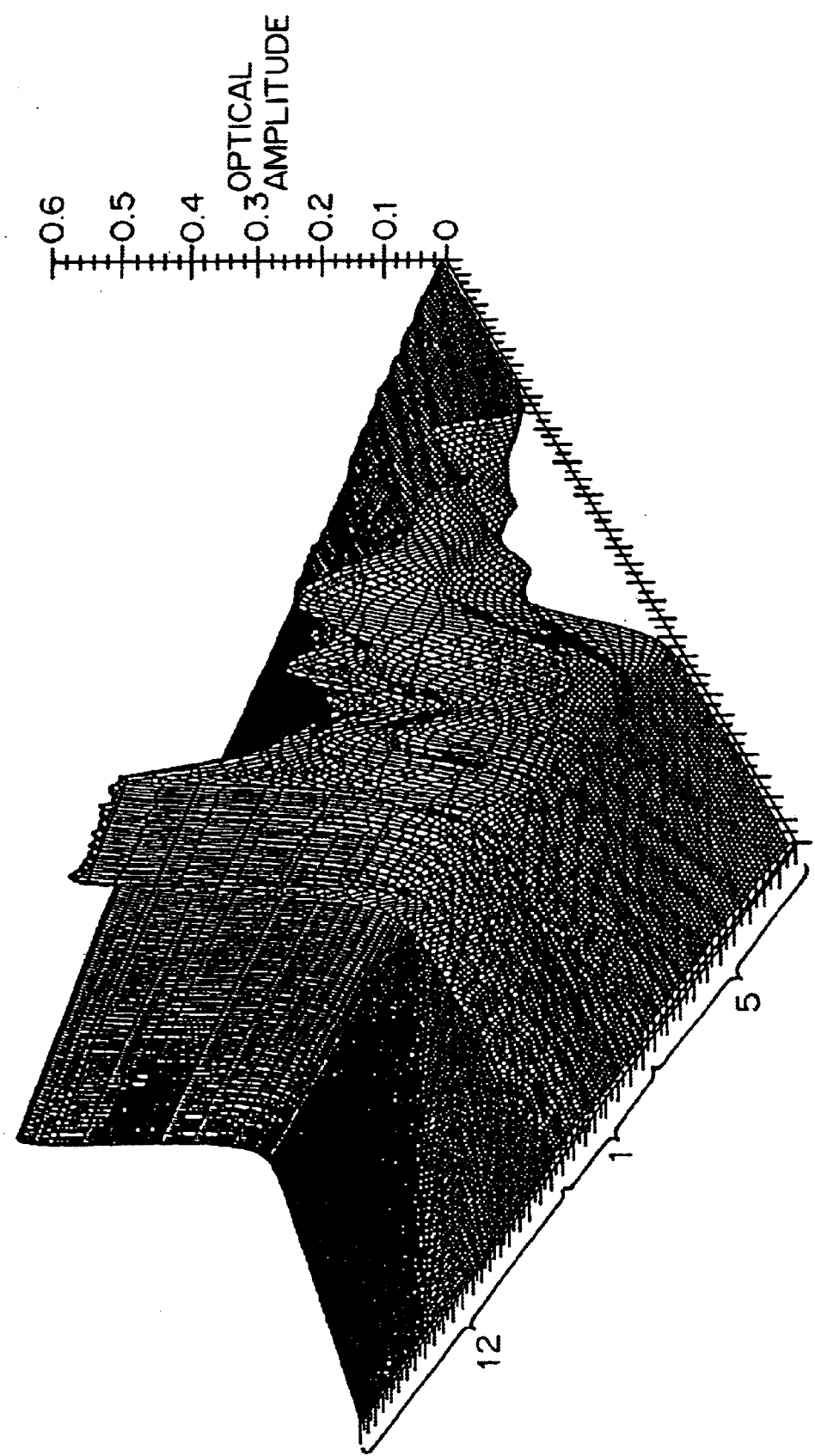
FIG. 4 is an explanatory diagram showing three-dimensionally the results of a simulation of optical amplitude distribution of light that travels along the optical input waveguide, a straight waveguide, and a trapezoidal waveguide in the first embodiment.

FIG. 4 shows the results of a simulation of this optical amplitude distribution. As shown in FIG. 4, the optical amplitude distribution immediately after the light is output from the straight waveguide 1 and enters the trapezoidal waveguide 5 has one peak. Thereafter, the optical amplitude distribution obtains one more peak (two peaks in total). The optical amplitude distribution gradually changes its shape as the light travels along the trapezoidal waveguide 5 to form four peaks when the light reaches the output end (lower base 6) of the trapezoidal waveguide 5.

FIG. 5 shows the optical amplitude distribution of light at the output end of the trapezoidal waveguide 5. The optical amplitude distribution shown in FIG. 5 has a large distance c' between peaks on both ends, shallow valley portions b', and much better base portions (on both ends) in terms of rising as compared with the optical amplitude distribution shown in FIG. 25.

According to this first embodiment, each straight waveguide 1 and each trapezoidal waveguide 5 are connected to the output end of the respective optical input waveguides 12, so that the optical amplitude distribution changes as above. The optical amplitude distribution of light at the output end of the trapezoidal waveguide 5 (in other words, at the entrance of the first slab waveguide 13) thus has four peaks as shown in FIG. 5. This makes it possible to provide an arrayed waveguide grating type optical multiplexer/demultiplexer in which the 1 dB band width is wide, the ripple is small, and the adjacent crosstalk is low.

As FIG. 4 clearly shows, the above optical amplitude distribution changes in the lengthwise direction of the trapezoidal waveguide 5. Therefore, the optical amplitude distribution of light at the output end of the trapezoidal waveguide 5 can be changed by suitably setting the length of the trapezoidal waveguide 5. In the structure of this first embodiment, accordingly, it is possible to manufacture an arrayed waveguide grating type optical multiplexer/demultiplexer having the above characteristics by setting the length, the width, and the taper angle θ of the trapezoidal waveguide 5 in accordance with specifications, or the like, of the arrayed waveguide grating type optical multiplexer/demultiplexer.

Moreover, this first embodiment has, unlike the structure shown in FIG. 21, a simple structure in which each straight waveguide I and each trapezoidal waveguide 5 with a width increasing toward the first slab waveguide 13 and with the oblique lines 3 that are substantially straight are connected to the output end of the respective optical input waveguides 12. Therefore, an arrayed waveguide grating type optical multiplexer/demultiplexer with a high yield can readily be manufactured.

Descriptions will be given below of specific examples of the first embodiment explained above. First, the arrayed waveguide grating type optical multiplexer/demultiplexer having the structure according to the first embodiment is manufactured by the following manufacturing method. To manufacture an arrayed waveguide grating, for example, first flame hydrolysis deposition is used to form an under cladding layer and a core layer on a silicon substrate. Then a photomask is prepared on which the waveguide structure of the arrayed waveguide grating is drawn, a transfer is performed by photolithography through the photomask, and the arrayed waveguide grating pattern is transferred onto the core layer by reactive ion etching. Then flame hydrolysis deposition is again used to form an over cladding layer. An optical multiplexer/demultiplexer is thus obtained.

Figure 3:
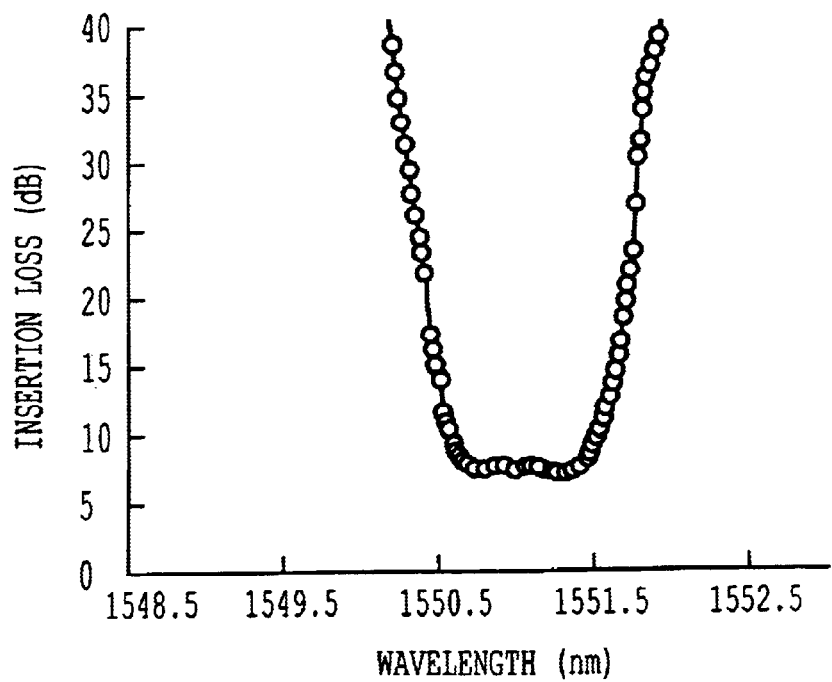
FIG. 3 is a graph showing wavelength loss characteristics in the first embodiment of the arrayed waveguide grating type optical multiplexer/demultiplexer.

The arrayed waveguide grating type optical multiplexer/demultiplexer thus manufactured corresponds to the first embodiment. The light transmission spectrum thereof has been measured to obtain its loss wavelength characteristics. The results are shown in FIG. 3. In this arrayed waveguide grating type optical multiplexer/demultiplexer, the 1 dB band width is 0.7 nm, the ripple is 0.2 dB, and the adjacent crosstalk is −28 dB.

Comparing these values with the values shown in Table 1, which represent characteristics of an arrayed waveguide grating type optical multiplexer/demultiplexer of the proposed example, it is apparent that the arrayed waveguide grating type optical multiplexer/demultiplexer according to the first embodiment shows superior values. It is confirmed by these values that the arrayed waveguide grating type optical multiplexer/demultiplexer according to the first embodiment has superior characteristics as an optical multiplexer/demultiplexer, including excellent wavelength flatness around the central wavelength of light to be multiplexed and demultiplexed, and low adjacent crosstalk.

The same manufacturing method as above was used to manufacture three arrayed waveguide grating type optical multiplexer/demultiplexers each having parameters of Table 2 and the same waveguide structure as in the first embodiment. These three arrayed waveguide grating type optical multiplexer/demultiplexers correspond to examples of the first embodiment, respectively. Note that these arrayed waveguide grating type optical multiplexers/demultiplexers also multiplex and demultiplex light with a wavelength interval of about 0.8 nm in a 1.55 μm band.

TABLE 2

|  | Example 2 | Example 3 | Example 4 |
|---|---|---|---|
| Width of optical input waveguide W1 (μm) | 6.5 | 6.5 | 6.5 |
| Width of straight waveguide W2 (μm) | 3.0 | 3.0 | 3.0 |
| Length of straight waveguide L1 (μm) | 500 | 500 | 500 |
| Length of straight waveguide L2 (μm) | 250 | 250 | 250 |
| Upper base width of trapezoidal waveguide W3 (μm) | 9.0 | 11.5 | 12.0 |
| Taper angle of trapezoidal waveguide θ (°) | 0.4 | 0.4 | 0.4 |
| Lower base width of trapezoidal waveguide W4 (μm) | 29.6 | 24.8 | 27.2 |

Figure 6:
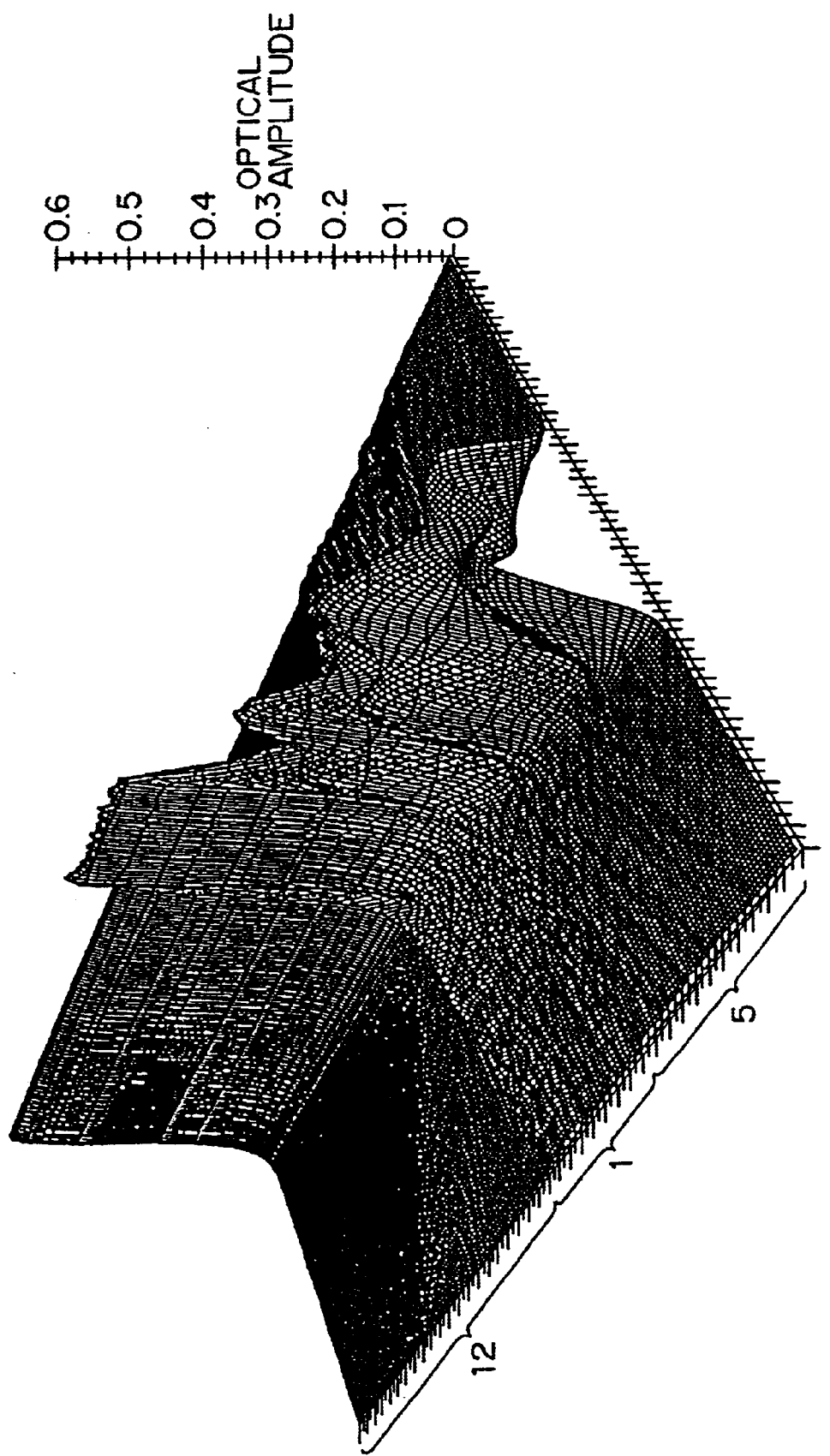
FIG. 6 is an explanatory diagram showing three-dimensionally the results of a simulation of optical amplitude distribution of light that travels along an optical input waveguide, a straight waveguide, and a trapezoidal waveguide in an example of an arrayed waveguide grating type optical multiplexer/demultiplexer according to the first embodiment.
Figure 7:
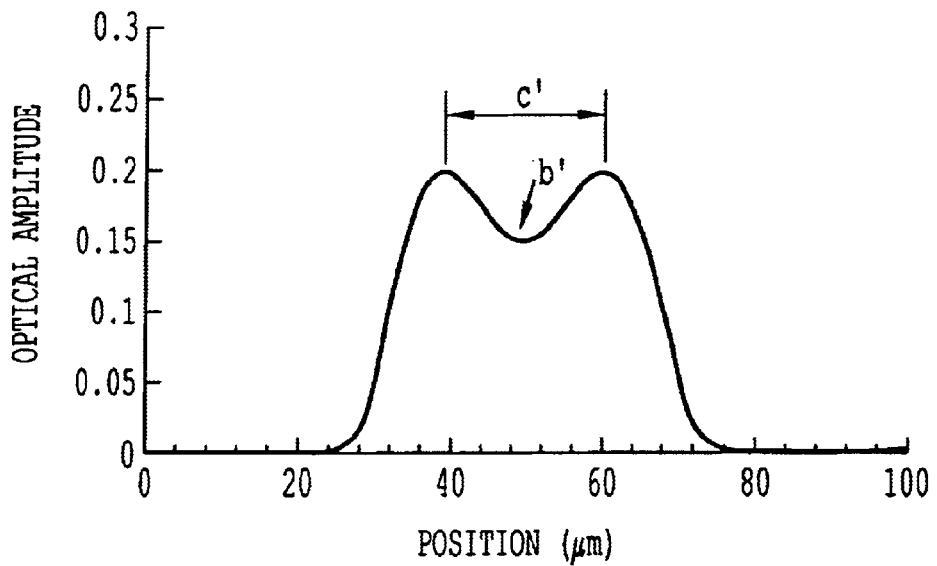
FIG. 7 is a graph showing optical amplitude distribution of light at the output end of the trapezoidal waveguide of the example of FIG. 6.

The optical amplitude distribution has been simulated for the example shown in Table 2, similar as discussed above with respect to the first embodiment. As a result, as shown in FIG. 6, in the example the optical amplitude distribution changes as the light travels along the trapezoidal waveguide 5 to have two peaks when the light reaches the output end (lower base 6) of the trapezoidal waveguide 5. The shape of the optical amplitude distribution of light at the output end of the trapezoidal waveguide 5 is as shown in FIG. 7. It is concluded that the optical amplitude distribution shown in FIG. 7 has a large distance c' between the peaks, a shallow valley portion b', and much better base portions (on both ends) in terms of rising as compared with the optical amplitude distribution shown in FIG. 25.

Measurement of loss wavelength characteristics has been performed on the arrayed waveguide grating type optical multiplexer/demultiplexers of the first to third examples of the first embodiment, obtaining the results as shown in Table 3. As seen from Table 3, each of them has better characteristics as compared with the loss wavelength characteristics of the arrayed waveguide grating type optical multiplexer/demultiplexer of the example of FIG. 22.

TABLE 3

|  | 1 dB band width (nm) | Ripple (dB) | Adjacent Crosstalk (dB) |
|---|---|---|---|
| Example 2 | 0.47 | 0.2 | −29 |
| Example 3 | 0.44 | 0.3 | −27 |
| Example 4 | 0.52 | 0.3 | −28 |

The optical amplitude distribution of light at the lower base 6 of the trapezoidal waveguide 5 has four peaks in example 1 whereas two peaks in example 4. However, in example 4 also, the distance c' between the peaks is large, the valley portion b' is shallow, and the base portions (on both ends) rise in an appropriate manner. Therefore, it is possible also in example 4 to provide an arrayed waveguide grating type optical multiplexer/demultiplexer in which the 1 dB band width is wide, the ripple is small, and the adjacent crosstalk is low.

Next, three arrayed waveguide grating type optical multiplexer/demultiplexers were designed and manufactured employing the values regarding size in example 2. Measurements were made on each of the three arrayed waveguide grating type optical multiplexer/demultiplexers to obtain loss wavelength characteristics, and the results shown in Table 4 confirm that production fluctuation among the arrayed waveguide grating type optical multiplexer/demultiplexers is very small. These arrayed waveguide grating type optical multiplexer/demultiplexers are referred to as a first optical multiplexer/demultiplexer, a second optical multiplexer/demultiplexer, and a third optical multiplexer/demultiplexer, respectively, in Table 4, The characteristics of the first to third optical multiplexer/demultiplexers are also better in comparison with the loss wavelength characteristics of the arrayed waveguide grating type optical multiplexer/demultiplexer of the proposed example.

TABLE 4

| | 1 dB band width (nm) | Ripple (dB) | Adjacent Crosstalk (dB) |
|---|---|---|---|
| First optical multiplexer/demultiplexer | 0.48 | 0.2 | −29 |
| Second optical multiplexer/demultiplexer | 0.47 | 0.3 | −30 |
| Third optical multiplexer/demultiplexer | 0.49 | 0.3 | −28 |

All of the arrayed waveguide grating type optical multiplexer/demultiplexer shown in Table 4 meet the standard when the standard is set, for example, such that the 1 dB band width is 0.35 nm or more, the ripple is 0.5 dB or less, and the adjacent crosstalk is −26 dB or less. They still are accepted products when this standard is modified so as to set the 1 dB band width to 0.4 nm or more.

As described above, the effectiveness of the first embodiment is more firmly assured by evaluating the results of the specific examples 1–3 of that embodiment discussed above.

Figure 8:
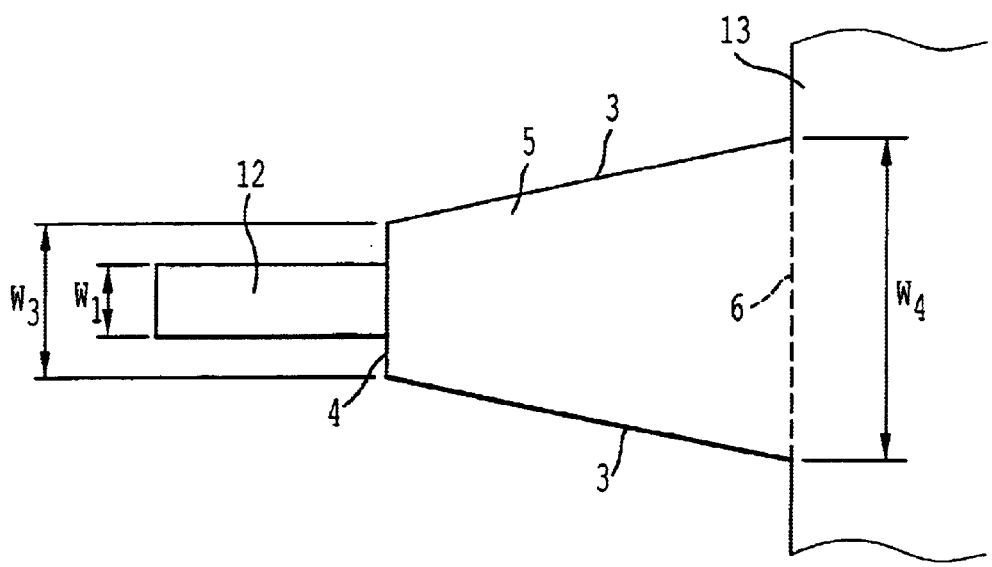
FIG. 8 is an explanatory diagram showing the structure of the output end of an optical input waveguide in a second embodiment of an arrayed waveguide grating type optical multiplexer/demultiplexer according to the present invention.

Descriptions given next are directed to a second embodiment of an arrayed waveguide grating type optical multiplexer/demultiplexer according to the present invention. In describing the second embodiment, the portions which have already been explained in descriptions of the first embodiment are not discussed again. FIG. 8 shows the structure of the junction between output ends of the optical input waveguides 12 and the first slab waveguide 13 in the arrayed waveguide grating type optical multiplexer/demultiplexer of the second embodiment. The second embodiment is structured in almost the same way as the first embodiment. However, the second embodiment differs from the first embodiment in that the straight waveguide 1 is omitted and each trapezoidal waveguide 5 is directly connected to the output end of the respective optical input waveguides 12.

This second embodiment is designed such that the central position of the intensity of light traveling along the optical input waveguides 12 does not deviate from the central position in width of the optical input waveguides 12. Accordingly, the optical amplitude distribution can be changed appropriately by the trapezoidal waveguide 5 without the straight waveguide 1 that is provided in the first embodiment. The same effect as in the first embodiment thus can be obtained through the same mechanism.

Figure 9:
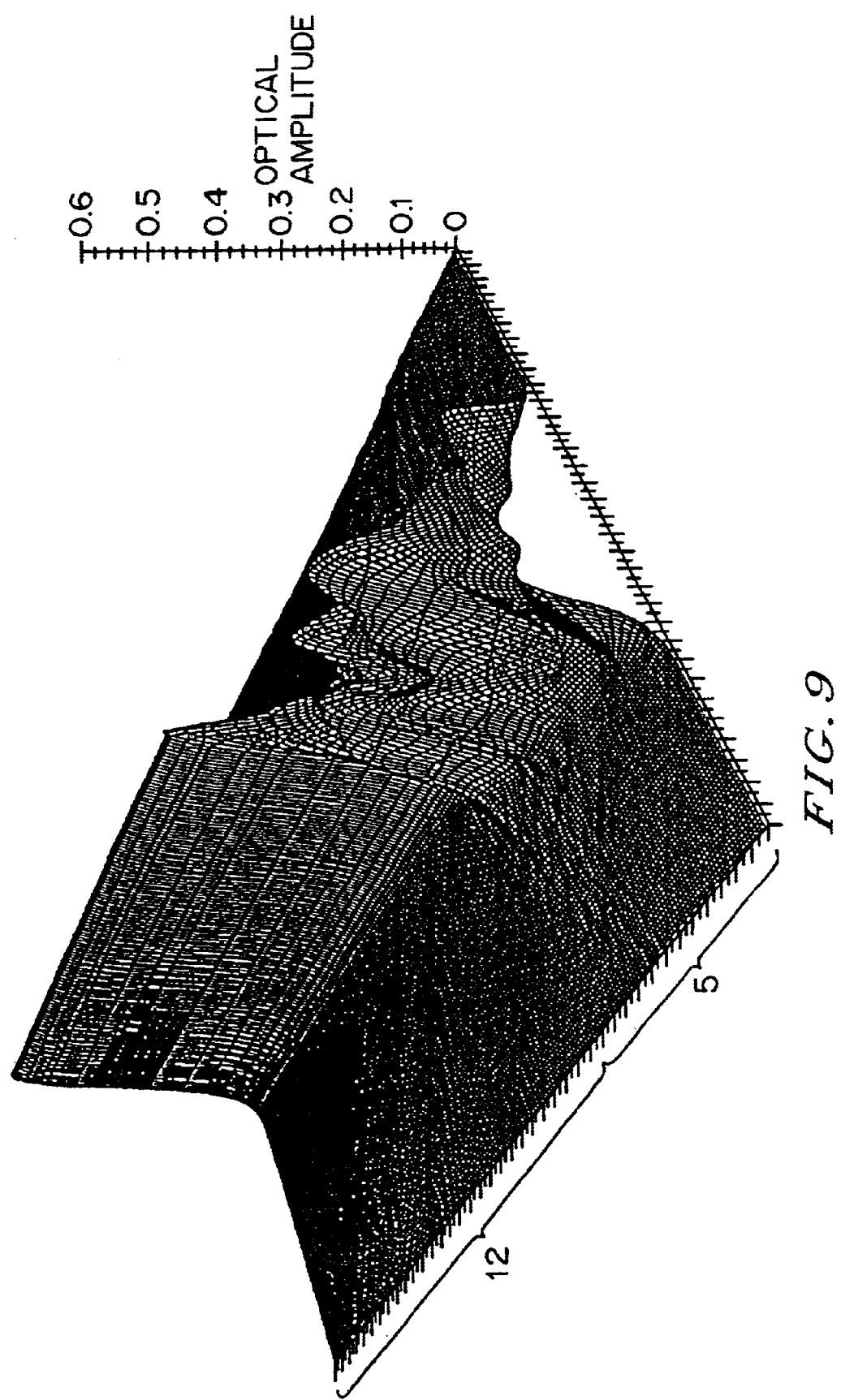
FIG. 9 is an explanatory diagram showing three-dimensionally the results of a simulation of optical amplitude distribution of light that travels along the optical input waveguide and a trapezoidal waveguide in the second embodiment.
Figure 10:
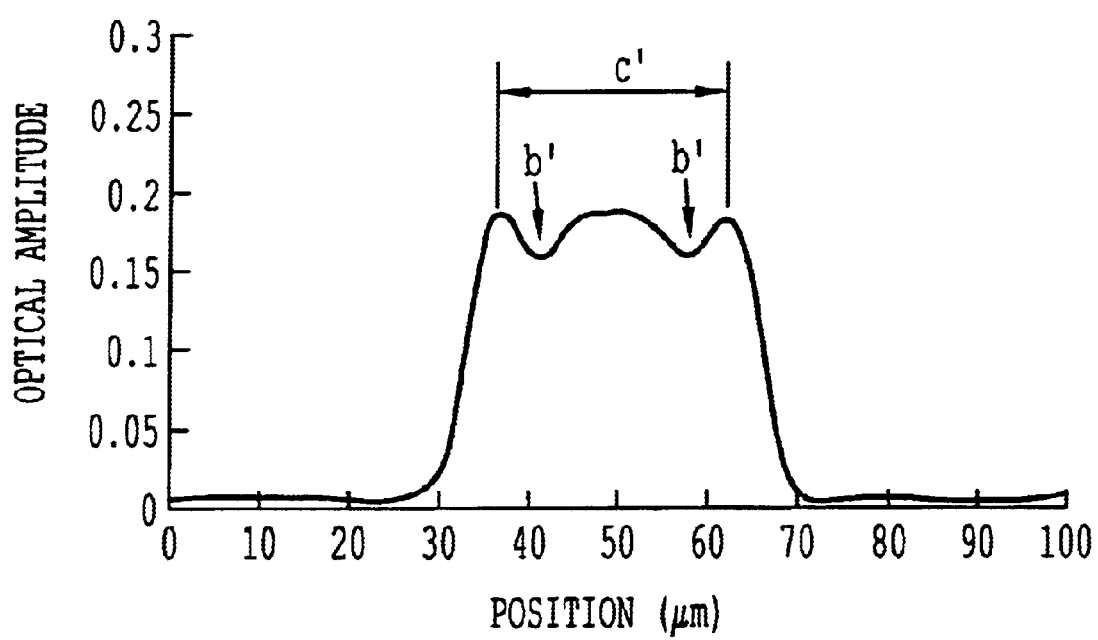
FIG. 10 is a graph showing optical amplitude distribution of light at the output end of the trapezoidal waveguide in the second embodiment.

The optical amplitude distribution in the second embodiment has been simulated setting the width W1 of each of the optical input waveguides 12 to 6.5 μm, the width W3 of the trapezoidal waveguide 5 at the upper base 4 to 20.0 μm, the taper angle θ to 0.4°, and the width W4 of the trapezoidal waveguide 5 at the lower base 6 to 35.0 μm. The results of the simulation are shown in FIG. 9, and the optical amplitude distribution of light at the lower base 6 of the trapezoidal waveguide 5 is shown in FIG. 10. As shown in FIG. 10, in this second embodiment also, similar to the first embodiment, the optical amplitude distribution of light at the output end of the trapezoidal waveguide 5 can have a large distance c' between the peaks, a shallow valley portion b', and base portions appropriate in terms of rising.

The second embodiment thus provides, as in the first embodiment, an arrayed waveguide grating type optical multiplexer/demultiplexer in which the 1 dB band width is wide, the ripple is small, and the adjacent crosstalk is low.

Figure 11A:
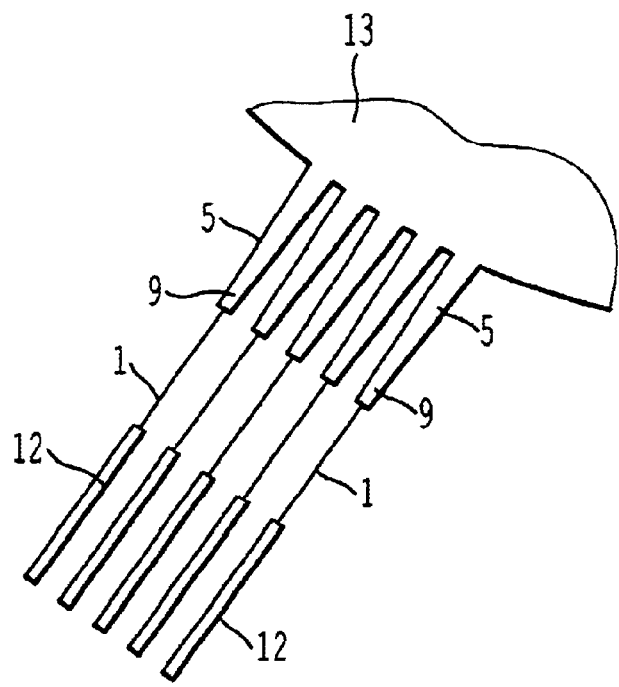
FIGS. 11A and 11B are diagrams illustrating a third embodiment of an arrayed waveguide grating type optical multiplexer/demultiplexer according to the present invention, in which 11A schematically shows the structure of the output end of an optical input waveguide and 11B schematically shows specifics thereof.
Figure 11B:
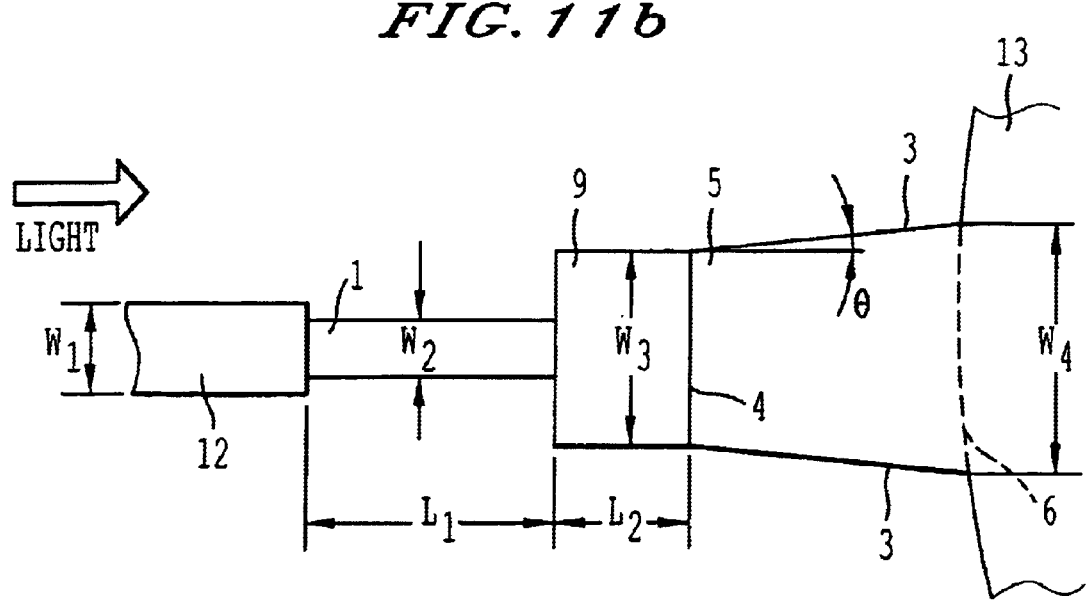

Next, the third embodiment of an arrayed waveguide grating type optical multiplexer/demultiplexer according to the present invention will be described. In describing the third embodiment, portions which have already been explained in descriptions of the first and second embodiments are not discussed again. FIGS. 11A and 11B illustrate the structure of the junction between output ends of optical input waveguides 12 and the first slab waveguide 13 in the arrayed waveguide grating type optical multiplexer/demultiplexer of the third embodiment.

The third embodiment is structured in almost the same way as the first embodiment. However, the third embodiment differs from the first embodiment in that an equal or constant width waveguide 9 having the same width as the narrower end (upper base 4) of the trapezoidal waveguide 5 is provided between the output end of the straight waveguide (narrow straight waveguide) 1 and the trapezoidal waveguide 5. With this structure, the constant width waveguide 9 and the trapezoidal waveguide 5 constitute the multi mode waveguide in the third embodiment.

Since the third embodiment is structured in almost the same way as the first embodiment, the straight waveguide 1 shifts the optical power center to the center of the straight waveguide 1 and enters the light to the center in width of the constant width waveguide 9. By setting the normalized frequency (V value) to 2.4 or more, the light input to the constant width waveguide 9 is broadened along the width of the waveguide as multi-mode optical amplitude distribution, and then enters and travels along the trapezoidal waveguide 5 while changing the optical amplitude distribution as in the first embodiment.

Figure 12:
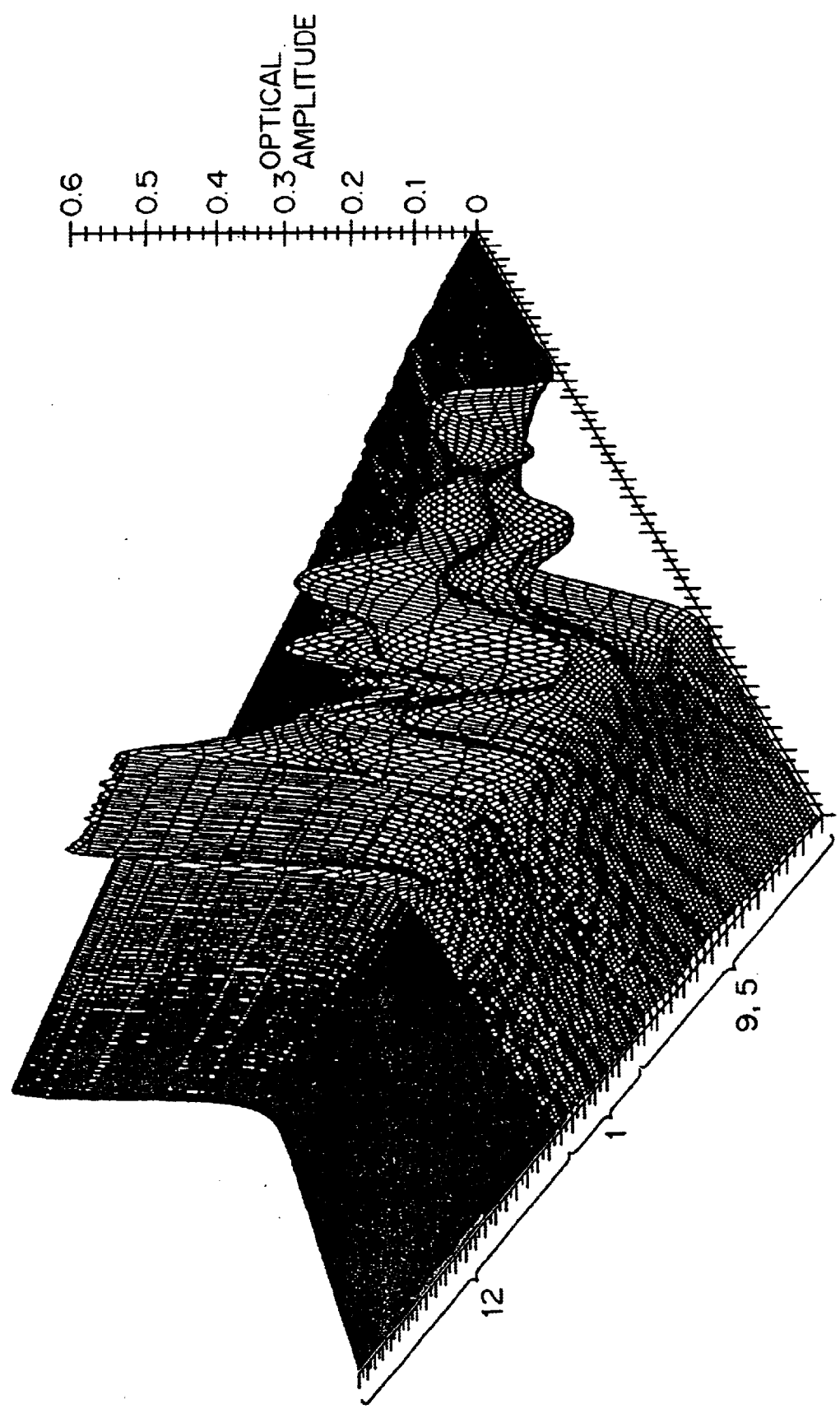
FIG. 12 is an explanatory diagram showing three-dimensionally the results of a simulation of optical amplitude distribution of light that travels along the optical input waveguide, a straight waveguide, a constant width waveguide, and a trapezoidal waveguide in the third embodiment.

FIG. 12 shows the results of simulation of the optical amplitude distribution in the third embodiment. The simulation is conducted setting the width W1 of each of the optical input waveguides 12 to 6.5 μm, the width W2 of the straight waveguide 1 to 3.0 μm, the length L1 of the straight waveguide 1 to 500 μm, the width W3 of the constant width waveguide 9 (the width of the trapezoidal waveguide 5 at the upper base 4) to 20.0 μm, the length L2 of the equal width waveguide 9 to 250 μm, the taper angle θ to 0.4°, and the width W4 of the trapezoidal waveguide 5 at the lower base 6 to 35.0 μm. The optical amplitude distribution of light at the output end (lower base 6) of the trapezoidal waveguide 5 is shown in FIG. 13.

Figure 13:
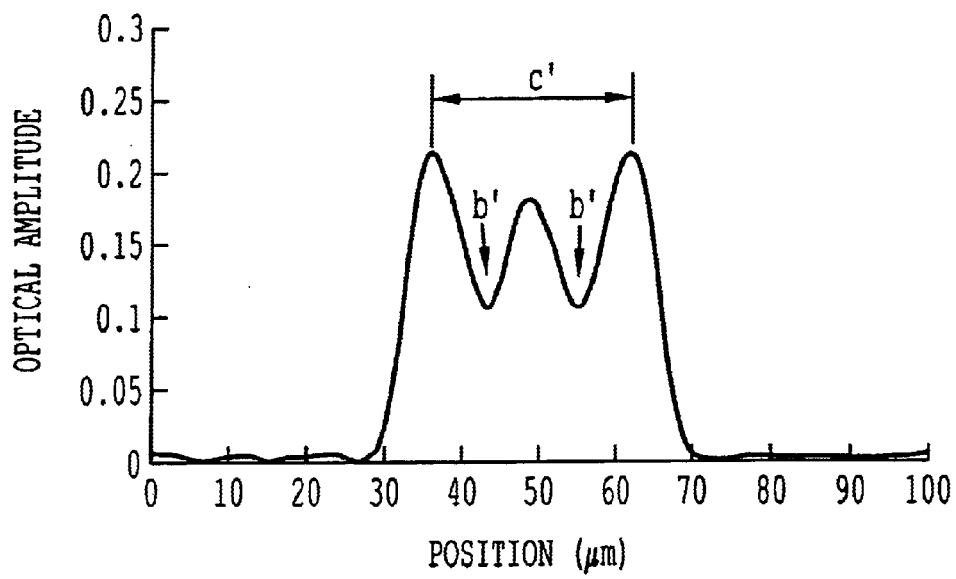
FIG. 13 is a graph showing optical amplitude distribution of light at the output end of the trapezoidal waveguide in the third embodiment.

As shown in FIGS. 12 and 13, in the third embodiment the optical amplitude distribution immediately after the light is output from the straight waveguide 1 to enter the constant width waveguide 9 has one peak. Thereafter, the optical amplitude distribution obtains one more peak (two peaks in total). The optical amplitude distribution gradually changes its shape as the light travels along the trapezoidal waveguide 5 to form three peaks when the light reaches the output end (lower base 6) of the trapezoidal waveguide 5. In the third embodiment also, similar to the first embodiment, the optical amplitude distribution of light at the output end of the trapezoidal waveguide 5 can have a large distance c' between the peaks, shallower valley portions b', and better base portions in terms of rising as compared with the optical amplitude distribution shown in FIG. 27.

Therefore, the same effect as in the first embodiment can be obtained also in the third embodiment through the same mechanism.

Descriptions will be given below of specific examples of the third embodiment. Three arrayed waveguide grating type optical multiplexer/demultiplexers having the structure of the third embodiment were manufactured by the same manufacturing method as for the examples of the first embodiment discussed above. These arrayed waveguide grating type optical multiplexer/demultiplexers correspond to example 5, example 6, and example 7, respectively. The arrayed waveguide grating type optical multiplexer/demultiplexers of examples 5 to 7 each have parameters shown in Table 5, and multiplex and demultiplex light with a wavelength interval of about 0.8 nm in a 1.55 μm band.

TABLE 5

|  | Example 5 | Example 6 | Example 7 |
|---|---|---|---|
| Width of optical input waveguide W1 (μm) | 6.5 | 6.5 | 6.5 |
| Width of straight waveguide W2 (μm) | 3.0 | 3.0 | 3.0 |
| Length of straight waveguide L1 (μm) | 500 | 500 | 500 |
| Length of equal width waveguide L2 (μm) | 250 | 250 | 250 |
| Upper base width of trapezoidal waveguide W3 (μm) | 9.0 | 11.5 | 12.0 |
| Taper angle of trapezoidal waveguide θ (°) | 0.4 | 0.4 | 0.4 |
| Lower base width of trapezoidal waveguide W4 (μm) | 29.6 | 24.8 | 27.2 |

Figure 14:
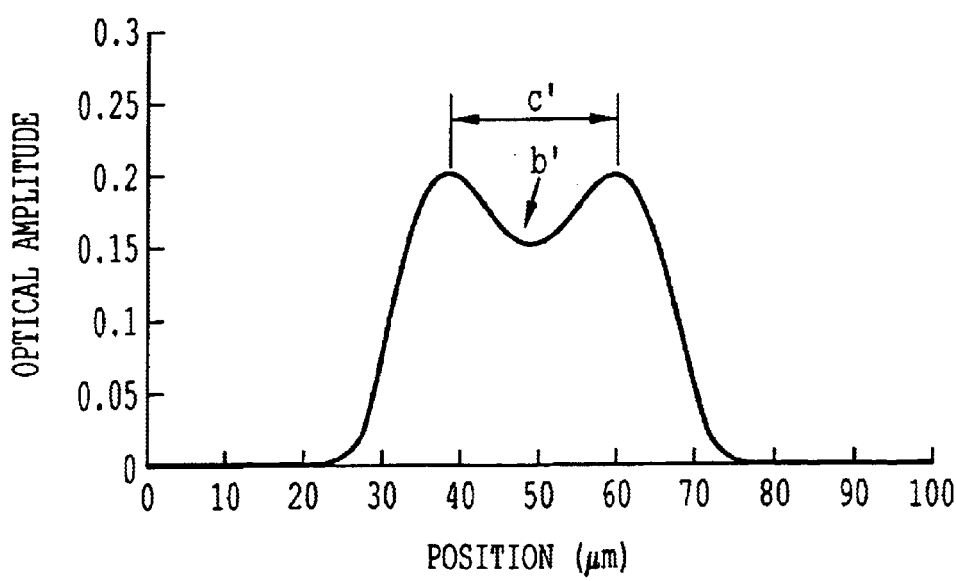
FIG. 14 is a graph showing optical amplitude distribution of light at the output end of a trapezoidal waveguide in an example of the third embodiment.

A simulation of the optical amplitude distribution of light at the output end of the trapezoidal waveguide 5 was performed on the arrayed waveguide grating type optical multiplexer/demultiplexer of example 7 using the beam propagation method. The result of the simulation is shown in FIG. 14. This optical amplitude distribution has two peaks, and the distance c' between the peaks is large and the valley portion b' is shallow, which makes its overall shape rather flat. The base portions thereof rise sharply.

Measurement of loss wavelength characteristics was performed on each of the arrayed waveguide grating type optical multiplexer/demultiplexers of examples 5 to 7, obtaining the results shown in Table 6.

TABLE 6

|  | 1 dB band width (nm) | Ripple (dB) | Adjacent Crosstalk (dB) |
|---|---|---|---|
| Example 5 | 0.45 | 0.1 | −28 |
| Example 6 | 0.44 | 0.1 | −30 |
| Example 7 | 0.53 | 0.15 | −27 |

Comparing the values in Table 6 with the values that are shown in Table 1 and which represent the characteristics of the arrayed waveguide grating type optical multiplexer/demultiplexer of the proposed example, it is clearly understood that the arrayed waveguide grating type optical multiplexer/demultiplexers of examples 5 to 7 each have a 1 dB band width equal to or wider than that of the proposed example, and that there is no crosstalk degradation in examples 5 to 7. Moreover, the ripple is kept at 0.15 dB or less in the arrayed waveguide grating type optical multiplexer/demultiplexers of examples 5 to 7.

Next, three arrayed waveguide grating type optical multiplexer/demultiplexers were designed and manufactured employing the values regarding size in example 5. Measurement was made on each of the arrayed waveguide grating type optical multiplexer/demultiplexers to obtain loss wavelength characteristics, and the results shown in Table 7 confirm that production variations among the arrayed waveguide grating type optical multiplexer/demultiplexers are very small. These arrayed waveguide grating type optical multiplexer/demultiplexers are referred to as a fourth optical multiplexer/demultiplexer, a fifth optical multiplexer/demultiplexer, and a sixth optical multiplexer/demultiplexer, respectively, in Table 7. The characteristics of the fourth to sixth optical multiplexer/demultiplexers are also better in comparison with the loss wavelength characteristics of the arrayed waveguide grating type optical multiplexer/demultiplexer of the proposed example. All the optical multiplexer/demultiplexers shown in Table 7 meet the standard when the standard for accepted products is −26 dB or less, for example. This is because the structure of the junction between the optical input waveguides 12 and the first slab waveguide 13 in the third embodiment is simpler than the slit-like waveguide 50 in the proposed example, and thus fluctuations in size in production can be reduced.

TABLE 7

|  | 1 dB band width (nm) | Adjacent Crosstalk (dB) |
|---|---|---|
| Fourth optical multiplexer/demultiplexer | 0.46 | −27 |
| Fifth optical multiplexer/demultiplexer | 0.45 | −29 |
| Sixth optical multiplexer/demultiplexer | 0.44 | −28 |

As described above, the effectiveness of the third embodiment is more firmly assured by evaluating the results of examples 5 to 7 of that embodiment discussed above.

Figure 15:
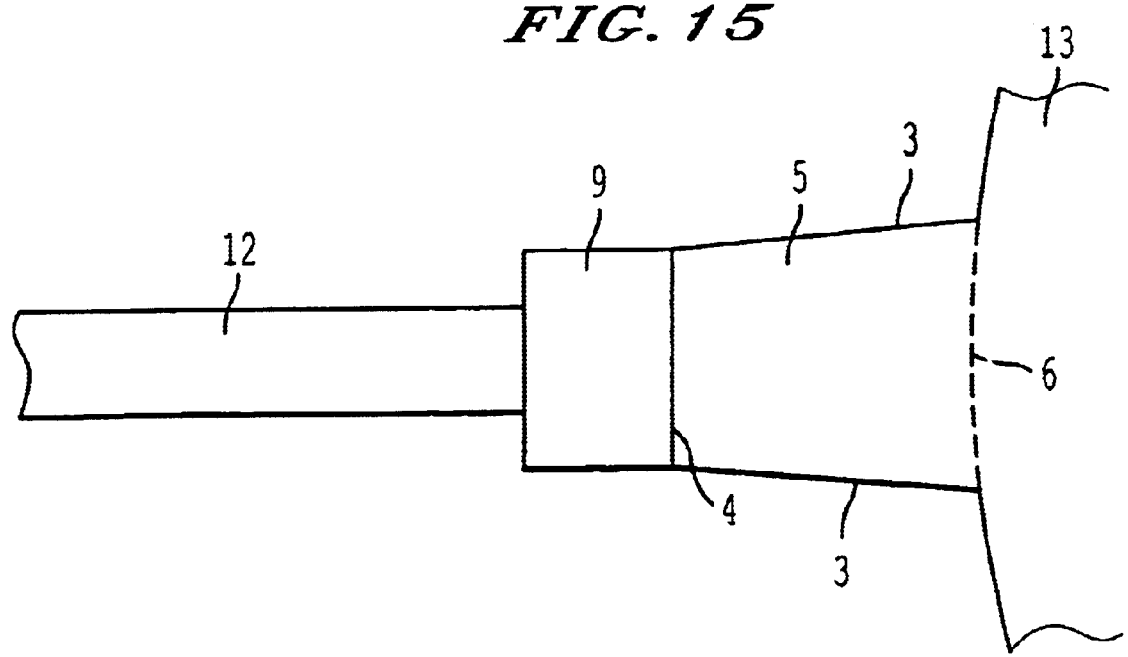
FIG. 15 is an explanatory diagram showing the structure of the output end of an optical input waveguide in a fourth embodiment of an arrayed waveguide grating type optical multiplexer/demultiplexer according to the present invention.

Descriptions given next are about the fourth embodiment of an arrayed waveguide grating type optical multiplexer/demultiplexer according to the present invention. FIG. 15 shows the structure of the junction between the output ends of the optical input waveguides 12 and the first slab waveguide 13 in the fourth embodiment. The fourth embodiment is structured in almost the same way as third embodiment. However, the fourth embodiment differs from the third embodiment in that the straight waveguide 1 is omitted.

This fourth embodiment is, similar to the second embodiment, designed such that the central position of the intensity of light traveling along the optical input waveguides 12 does not deviate from the central position in width of the optical input waveguides 12. Accordingly, the optical amplitude distribution can be changed appropriately by the equal width waveguide 9 and the trapezoidal waveguide 5 without the straight waveguide 1. The same effect as in the third embodiment thus can be obtained in the fourth embodiment.

Figure 16:
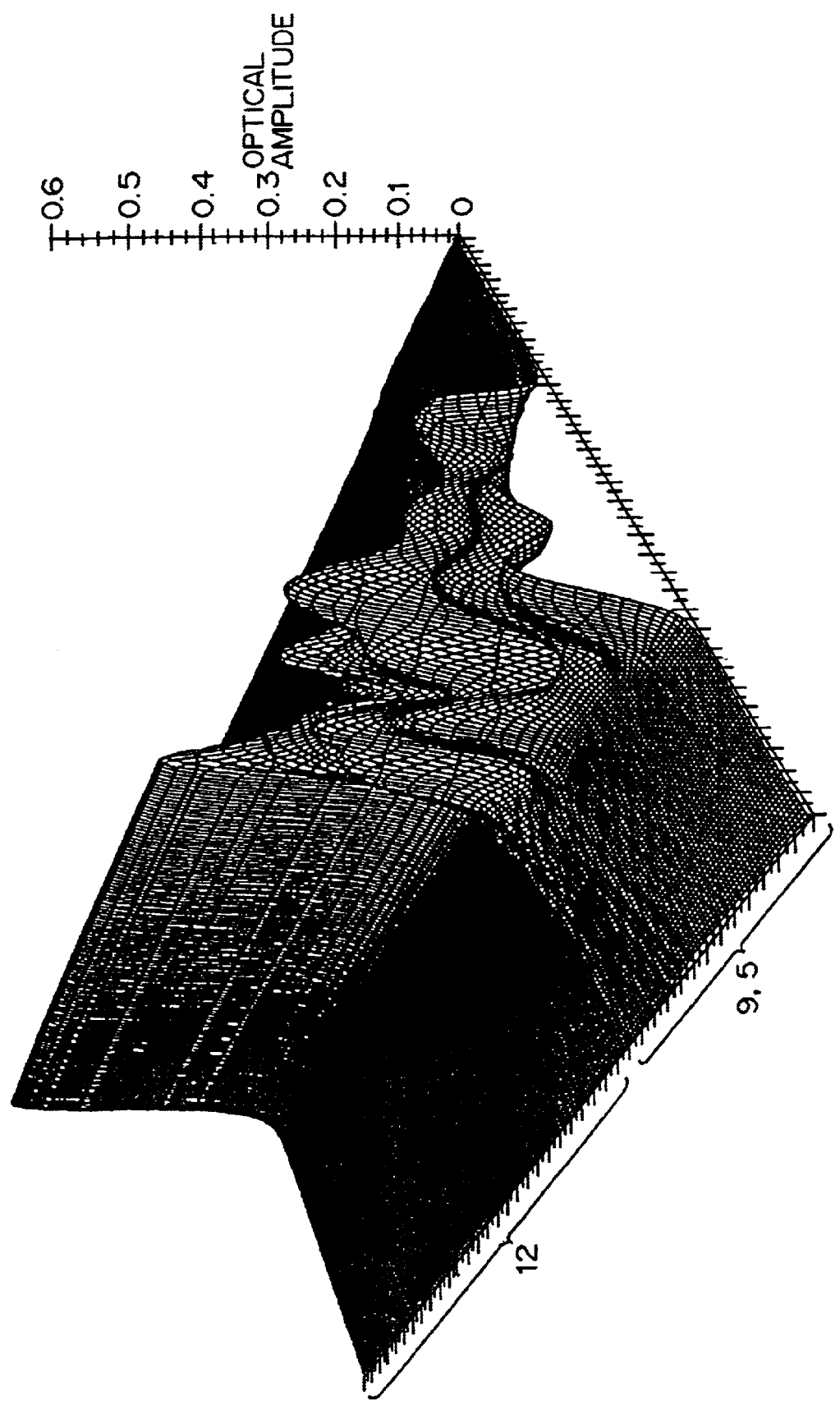
FIG. 16 is an explanatory diagram showing three-dimensionally the results of a simulation of optical amplitude distribution of light that travels along the optical input waveguide, an equal width waveguide, and a trapezoidal waveguide in the fourth embodiment.
Figure 17:
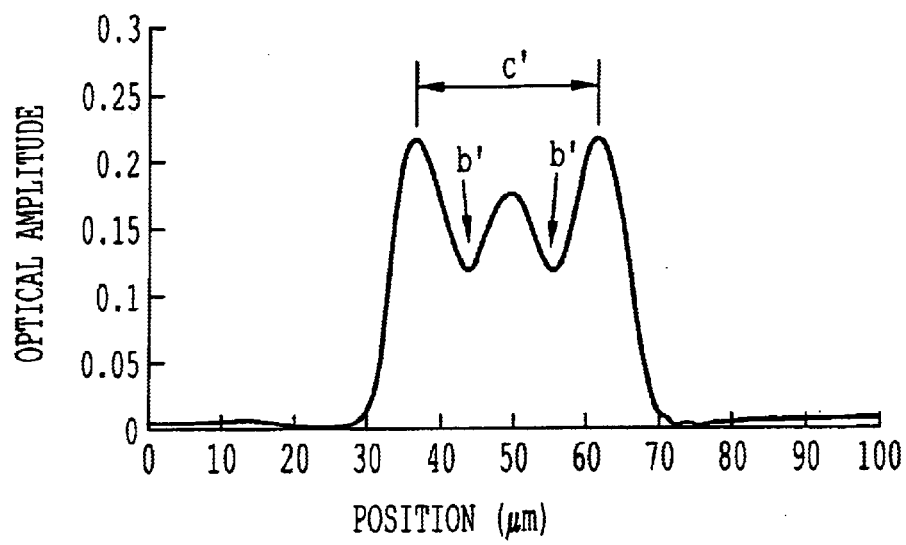
FIG. 17 is a graph showing optical amplitude distribution of light at the output end of the trapezoidal waveguide in the fourth embodiment.

The optical amplitude distribution in the fourth embodiment has been simulated setting the width W1 of each of the optical input waveguides 12 to 6.5 μm, the width W3 of the equal width waveguide 9 (the width of the trapezoidal waveguide 5 at the upper base 4) to 20.0 μm, the length L2 of the equal width waveguide 9 to 250 μm, the taper angle 9 to 0.40, and the width W4 of the trapezoidal waveguide 5 at the lower base 6 to 35.0 μm. The result of the simulation is shown in FIG. 16, and the optical amplitude distribution of light at the lower base 6 of the trapezoidal waveguide 5 is shown in FIG. 17.

In the fourth embodiment also, similar to the other embodiments discussed above, the optical amplitude distribution of light at the output end of the trapezoidal waveguide 5 can have a large distance c' between the peaks, relatively shallow valley portions b', and base portions appropriate in terms of rising.

Figure 18:
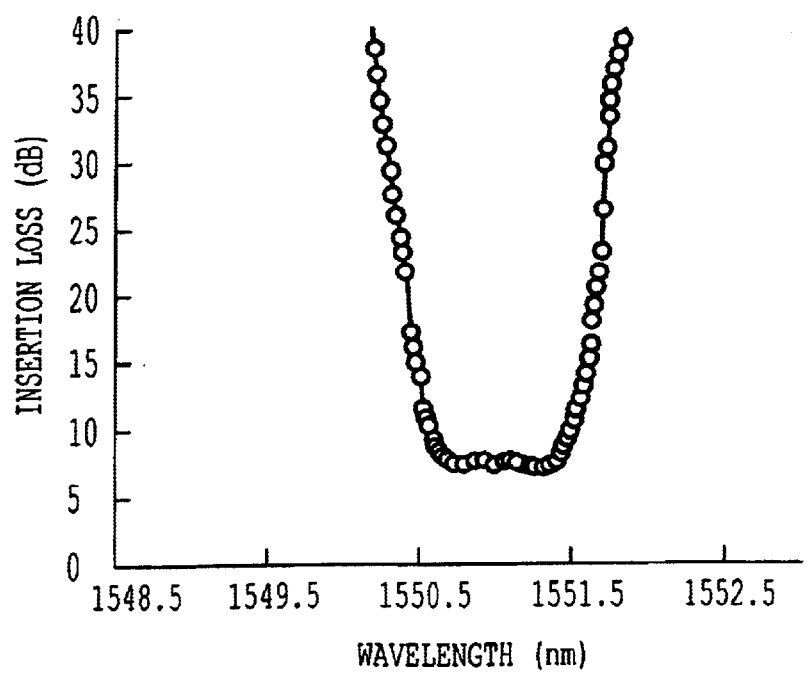
FIG. 18 is a graph showing wavelength loss characteristics in the fourth embodiment.
Figure 19A:
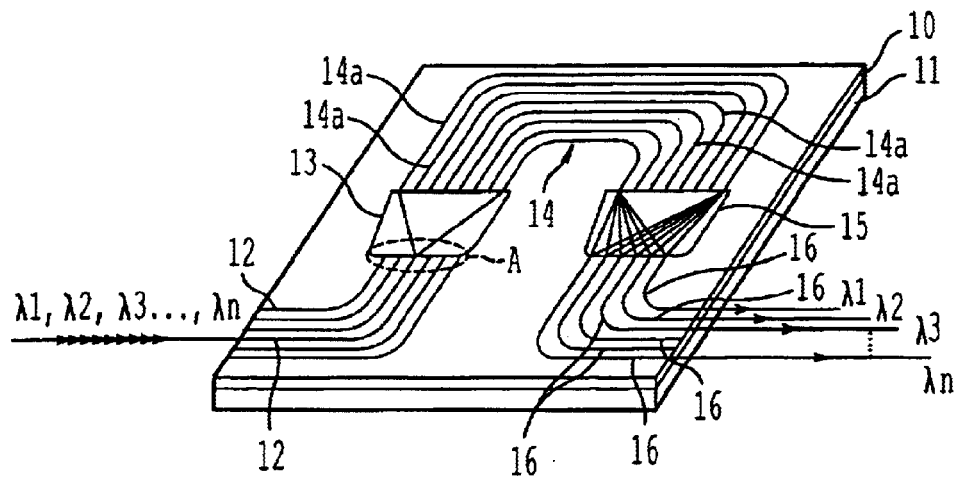
FIGS. 19A and 19B are explanatory diagrams showing the structure of a general arrayed waveguide grating type optical multiplexer/demultiplexer in the background art.
Figure 19B:
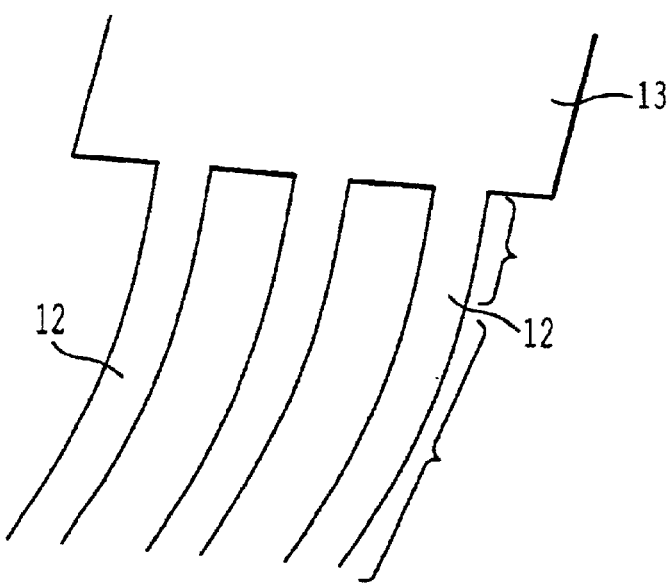

The light transmission spectrum of the arrayed waveguide grating type optical multiplexer/demultiplexer of the fourth embodiment which has the above parameters has been measured to obtain its loss wavelength characteristics. The result is shown in FIG. 18. The front of the curve of the loss wavelength characteristics in FIG. 18 forms are very flat. As is apparent in FIG. 18, this arrayed waveguide grating type optical multiplexer/demultiplexer has very excellent characteristics in which the 1 dB band width is 0.8 nm, the adjacent crosstalk is −28 dB, and the ripple is 0.2 dB.

Thus, it is confirmed that a superior arrayed waveguide grating type optical multiplexer/demultiplexer having the excellent effects mentioned above can be provided by the novel structure of the present invention as described in the above discussed embodiments.

The present invention is not limited to the above discussed embodiments, but can adopt various modifications. For instance, a trapezoidal waveguide S whose width increases toward the second slab waveguide 15 may be provided on the input end of the optical output waveguide 16. Alternatively, the trapezoidal waveguide may be provided at both the output end of the optical input waveguide 12 and the input end of the optical output waveguide 16.

When each trapezoidal waveguide 5 is provided at each of the at least one or more optical output waveguides 16, the straight waveguide 1 as described in the first embodiment may be interposed between each optical output waveguides 16 and each trapezoidal waveguide 5. It is also possible to form the constant width waveguide 9 and the straight waveguide (narrow straight waveguide) 1 between the optical output waveguides 16 and the trapezoidal waveguide 5 as in the third and fourth embodiments.

The trapezoidal waveguide 5 has to be wider than the optical output waveguides 16 if the trapezoidal waveguide 5 is provided at the optical output waveguides 16. On the other hand, the straight waveguide 1 has to be narrower than the optical output waveguides 16 if the straight waveguide 1 is interposed between the optical output waveguides 16 and the trapezoidal waveguide 5.

The present invention does not put particular limitations on the width, the length, and the taper angle of the trapezoidal waveguide, the width and the length of the straight waveguide, and the length of the constant width waveguide, and these parameters are suitably set. If these parameters are set in accordance with specifications of an arrayed waveguide grating type optical multiplexer/demultiplexer and based on the results of simulation of the optical amplitude distribution as shown in FIGS. 4, 6, 9, 12, and 16, for example, the arrayed waveguide grating type optical multiplexer/demultiplexer can have the excellent effects described in the above embodiments.

The multi-mode waveguide to be applied to the arrayed waveguide grating type optical multiplexer/demultiplexer of the present invention does not necessarily include a trapezoidal waveguide. It is sufficient for the multi-mode waveguide to be wide enough to realize multi-mode and to have in at least a part thereof a waveguide whose width increases toward the arrayed waveguide.

The structure of the optical waveguide circuit of the present invention as shown in, for example, FIGS. 2, 8, 11A, 11B, and 15 are adopted as a part of the circuit structure of the arrayed waveguide grating type optical multiplexer/demultiplexer in the above embodiments. However, the optical waveguide circuit of the present invention can be applied to any circuit structure other than the arrayed waveguide grating type optical multiplexer/demultiplexer.

The multi-mode waveguide to be applied to the optical waveguide circuit of the present invention does not necessarily include a trapezoidal waveguide. It is sufficient for the multi-mode waveguide to be wide enough to realize multi-mode and to have in at least a part thereof a multi-mode broadening waveguide whose width increases in a direction of the light propagation.

According to the arrayed waveguide grating type optical multiplexer/demultiplexer of the present invention, the multi-mode waveguide wide enough to realize multi mode is connected to, for example, the output end of the optical input waveguide, and the multi mode waveguide has in at least a part thereof a waveguide whose width increases toward the arrayed waveguide. For instance, a trapezoidal waveguide which increases its width toward the arrayed waveguide and which has oblique lines almost straight can be connected to the output end of the optical input waveguide, and the trapezoidal waveguide is wider than the optical input waveguide.

Thus structured arrayed waveguide grating type optical multiplexer/demultiplexer of the present invention is, owing to its characteristic structure described above, capable of broadening light along the width of the trapezoidal waveguide as multi-mode distribution, improving the rising of the base portions in the optical amplitude distribution as the light travels toward the arrayed waveguide (toward the first slab guide), and increasing the distance between peaks in the optical amplitude distribution.

In the thus structured arrayed waveguide grating type optical multiplexer/demultiplexer of the present invention, the 1 dB band width is wide, the ripple is small, and the adjacent crosstalk is low. The arrayed waveguide grating type optical multiplexer/demultiplexer thus can have very excellent capabilities as an optical multiplexer/demultiplexer for light that has undergone wavelength division multiplexing. Furthermore, the structure of the present invention is simple and, hence, can provide an arrayed waveguide grating type optical multiplexer/demultiplexer with a high yield which is easy to manufacture.

The arrayed waveguide grating type optical multiplexer/demultiplexer utilizes reciprocity of the optical circuit. It is therefore possible for the arrayed waveguide grating type optical multiplexer/demultiplexer of the present invention to obtain the same effect also in the case in which a multi-mode waveguide having in at least a part thereof a waveguide whose width increases toward the arrayed waveguide is connected to the entrance end of the optical output waveguide. An example of such a waveguide with increasing width is a trapezoidal waveguide which has a width increasing toward the arrayed waveguide, which has oblique lines substantially straight, and which is wider than the optical output waveguide.

It is also possible to obtain the same effects as above with an arrayed waveguide grating type optical multiplexer/demultiplexer in which a constant width waveguide as narrow as the narrower end of the trapezoidal waveguide is formed at the narrower end of the trapezoidal waveguide.

The arrayed waveguide grating type optical multiplexer/demultiplexer of the present invention is capable of making the overall intensity distribution shape of light that is output from the trapezoidal waveguide free from deformation. This is achieved by providing a straight waveguide narrower than the optical input waveguides between the optical input waveguide and the trapezoidal waveguide. Alternatively, this is achieved by providing, in the structure in which the constant width waveguide is formed, a narrow straight waveguide between the constant width waveguide and its associated one of the optical input waveguides. Because of this straight waveguide or the constant straight guide, if each of the optical input waveguides has a curved portion and the central position of the light intensity distribution deviates from the center in width of the optical input waveguide after the light has traveled through this carved portion, the central position of the light intensity distribution can be moved to the center of the straight waveguide while the light travels along the straight waveguide. The light intensity center thus can be input in the center in width of the trapezoidal waveguide.

The arrayed waveguide grating type optical multiplexer/demultiplexer utilizes the reciprocity of the optical circuit. It is therefore possible to obtain the same effect as above also with the arrayed waveguide grating type optical multiplexer/demultiplexer of the present invention in which the straight waveguide narrower than the optical output waveguide is interposed between the trapezoidal waveguide and its associated one of the optical output waveguides. Furthermore, the arrayed waveguide grating type optical multiplexer/demultiplexer of the present invention in which the narrow straight waveguide is interposed between the equal width waveguide and its associated one of the optical output waveguides can also provide the same effect.

The optical waveguide circuit according to the embodiments of the present invention includes a single mode waveguide, and a multi-mode waveguide which has a multi mode broadening waveguide whose width increases toward a direction of the light traveling forward and which is connected to the single mode waveguide. Therefore, it is possible to improve, as the light travels, the rising of the base portions of the optical amplitude distribution of light that is output from the single mode waveguide, and to increase the distance between the peaks of the optical amplitude distribution. Applying this structure to various circuit structure such as an arrayed waveguide grating type optical multiplexer/demultiplexer, effects such as improvement in flatness of light to be divided can be obtained.

In the optical waveguide circuit of the present invention, if the multi-mode broadening waveguide is the trapezoidal waveguide, the above effects can be efficiently exerted with a very simple structure.

Obviously, numerous additional modifications and variations of the present invention are possible in light of the above teachings. It is therefore to be understood that within the scope of the appended claims, the present invention may be practiced otherwise than as specifically described herein.

What is claimed is:

1. An optical waveguide comprising:
   a single mode waveguide;
   a multi-mode waveguide configured to realize multi-mode and connected to said single mode waveguide, said multi-mode waveguide being a multi-mode broadening waveguide having a width which increases toward a direction of light propagation.

2. An optical waveguide according to claim 1, wherein said multi-mode broadening waveguide has a trapezoidal shape with first and second bases connected by oblique sides.

3. An optical waveguide according to claim 2, wherein the single mode waveguide comprises an optical input waveguide with a first width and a straight waveguide with a second width less than the first width, said second width of said straight waveguide is further less than a width of both said first and second bases.

4. An optical waveguide according to claim 1, wherein said multi-mode waveguide includes a constant width waveguide connected to said single mode waveguide and a trapezoidal shaped waveguide connected to said constant width waveguide as said multi-mode broadening waveguide.

5. An optical waveguide according to claim 4, wherein the single mode waveguide comprises an optical input waveguide with a first width and a straight waveguide with a second width less than the first width, said second width of said straight waveguide is further less than a width of both said first and second bases.

6. An arrayed waveguide grating optical multiplexer/demultiplexer comprising:
   at least one optical input waveguide;
   a first slab waveguide connected to an output end of said at least one optical input waveguide;
   an arrayed waveguide connected to an output end of said first slab waveguide and being a plurality of channel waveguides arranged side by side, for transmitting light that has traveled through said first slab waveguide, said channel waveguides having different predetermined lengths;
   a second slab waveguide connected to an output end of said arrayed waveguide;
   at least one optical output waveguide connected to an output end of said second slab waveguide; and
   at least one multi-mode waveguide connected between at least one of said at least one optical input waveguide and said first slab waveguide or between said second slab waveguide and said at least one optical output waveguide, said at least one multi-mode waveguide including:
   a multi-mode waveguide configured to realize multi-mode and being a multi-mode broadening waveguide having a width which increases toward a direction of an arrayed waveguide.

7. An arrayed waveguide grating optical multiplexer/demultiplexer according to claim 6, wherein said at least one input waveguide includes a plurality of input waveguides arranged side by side and said at least one output waveguide includes a plurality of output waveguides arranged side by side.

8. An arrayed waveguide grating optical multiplexer/demultiplexer according to claim 7, wherein said multi-mode broadening waveguide has a trapezoidal shape with first and second bases connected by oblique sides.

9. An arrayed waveguide grating optical multiplexer/demultiplexer according to claim 7, wherein the single mode waveguide comprises an optical input waveguide with a first width and a straight waveguide with a second width less than the first width, said second width of said straight waveguide is further less than a width of both said first and second bases.

10. An arrayed waveguide grating optical multiplexer/demultiplexer according to claim 7, wherein said multi-mode waveguide includes a constant width waveguide connected to said single mode waveguide and a trapezoidal shaped waveguide connected to said constant width waveguide as said multi-mode broadening waveguide.

11. An arrayed waveguide grating optical multiplexer/demultiplexer according to claim 7, wherein said multi-mode waveguide includes a constant width waveguide connected to said single mode waveguide and a trapezoidal shaped waveguide connected to said constant width waveguide as said multi-mode broadening waveguide.

12. An arrayed waveguide grating optical multiplexer/demultiplexer according to claim 6, wherein said multi-mode broadening waveguide has a trapezoidal shape with first and second bases connected by oblique sides.

13. An arrayed waveguide grating optical multiplexer/demultiplexer according to claim 6, wherein the single mode waveguide comprises an optical input waveguide with a first width and a straight waveguide with a second width less than the first width, said second width of said straight waveguide is further less than a width of both said first and second bases.

14. An arrayed waveguide grating optical multiplexer/demultiplexer according to claim 6, wherein said multi-mode waveguide includes a constant width waveguide connected to said single mode waveguide and a trapezoidal shaped waveguide connected to said constant width waveguide as said multi-mode broadening waveguide.

15. An arrayed waveguide grating optical multiplexer/demultiplexer according to claim 6, wherein the single mode waveguide comprises an optical input waveguide with a first width and a straight waveguide with a second width less than the first width, said second width of said straight waveguide is further less than a width of both said first and second bases.

16. An arrayed waveguide grating optical multiplexer/demultiplexer comprising:
single mode waveguide means for propagating a single mode optical signal;
multi-mode waveguide means for propagating a multi-mode optical signal connected to said single mode waveguide means, said multi-mode waveguide including multi-mode broadening waveguide means having a width increasing in a direction of an arrayed waveguide.

17. An array waveguide grating optical multiplexer/demultiplexer comprising:
input optical waveguide means for receiving an optical signal;
first slab waveguide means connected to an output end of said optical input waveguide means;
arrayed waveguide means connected to an output end of said first slab waveguide mean for transmitting light that has traveled through said first slab waveguide;
second slab waveguide means connected to an output end of said arrayed waveguide means;
output optical waveguide means connected to an output end of said second slab waveguide means; and
multi-mode waveguide means at least one multi-mode waveguide connected between at least one of said at least one optical input waveguide and said first slab waveguide or between said second slab waveguide and said at least one optical output waveguide, said at least one multi-mode waveguide for realizing multi-mode and including multi-mode broadening waveguide means.

18. An arrayed waveguide grating optical multiplexer/demultiplexer comprising:
at least one first optical waveguide;
a first slab waveguide;
an arrayed waveguide connected to said at least one first optical waveguide via said first slab waveguide, said arrayed waveguide comprising a plurality of channel waveguides each of which has a different length;
a second slab waveguide;
a plurality of second optical waveguides connected to said arrayed waveguide via said second slab waveguide; and
at least one multi-mode waveguide having a first end portion and a second end portion, a second width of the second end portion being larger than a first width of the first end portion, the first end portion of each of said at least one multi-mode waveguide being connected to each of said at least one first optical waveguide, the second end portion of each of said at least one multi-mode waveguide being connected to said first slab waveguide, a width of said at least one multi-mode waveguide increasing from the first end portion toward the second end portion and being configured to realize multi-mode.

19. An arrayed waveguide grating optical multiplexer/demultiplexer according to claim 18, further comprising:
at least one constant width waveguide provided between each of said at least one first optical waveguide and each of said at least one multi-mode waveguide, said at least one constant width waveguide having a substantially constant width which is substantially equal to the first width of the first end portion of said at least one multi-mode waveguide.

20. An arrayed waveguide grating optical multiplexer/demultiplexer according to claim 19, further comprising:
at least one straight waveguide provided between each of said at least one first optical waveguide and each of said at least one constant width waveguide, said at least one straight waveguide having a width narrower than the first optical waveguide width of said at least one first optical waveguide.

21. An arrayed waveguide grating optical multiplexer/demultiplexer according to claim 18, further comprising:
at least one straight waveguide each provided between each of said at least one first optical waveguide and each of said at least one multi-mode waveguide, said at least one straight waveguide having a width narrower than the first optical waveguide width of said at least one first optical waveguide.

22. An arrayed waveguide grating optical multiplexer/demultiplexer according to claim 18, wherein said at least one multi-mode waveguide has a trapezoidal shape in which the first end portion is an upper base and the second end portion is a lower base.

23. An arrayed waveguide grating optical multiplexer/demultiplexer according to claim 18, wherein all of said at least one first optical waveguide are connected to all of said plurality of expanding width waveguides, respectively.

24. An arrayed waveguide grating optical multiplexer/demultiplexer according to claim 18, wherein said at least one first optical waveguide comprises a plurality of first optical waveguides, said at least one multi-mode width waveguide comprises a plurality of multi-mode width waveguides, and wherein at least one of the plurality of first optical waveguides is connected to said first slab waveguide via at least one of the plurality of multi-mode width waveguides.

25. An arrayed waveguide grating optical multiplexer/demultiplexer comprising:
at least one first optical waveguide;
a first slab waveguide;
an arrayed waveguide connected to said at least one first optical waveguide via said first slab waveguide, said arrayed waveguide comprising a plurality of channel waveguides each of which has a different length;
a second slab waveguide;
a plurality of second optical waveguides connected to said arrayed waveguide via said second slab waveguide; and
a plurality of multi-mode waveguides each having a third end portion and a fourth end portion, a fourth width of the fourth end portion being larger than a third width of the third end portion, the third end portion of each of said plurality of multi-mode waveguides being connected to each of said plurality of second optical waveguides, the fourth end portion of each of said plurality of multi-mode waveguides being connected to said second slab waveguide, a width of said multi-mode waveguides increasing from the third end portion toward the fourth end portion and being configured to realize multi-mode.

26. An arrayed waveguide grating optical multiplexer/demultiplexer according to claim 25, further comprising:
a plurality of constant width waveguides each provided between each of said plurality of second optical waveguides and each of said plurality of multi-mode waveguides, each of said plurality of constant width waveguides having a substantially constant width which is substantially equal to the third width of the third end portion.

27. An arrayed waveguide grating optical multiplexer/demultiplexer according to claim 26, further comprising:
a plurality of straight waveguides each provided between each of said plurality of second optical waveguides and each of said plurality of constant width waveguides, each of said plurality of straight waveguides having a width narrower than the second optical waveguide width of each of said plurality of second optical waveguides.

28. An arrayed waveguide grating optical multiplexer/demultiplexer according to claim 25, further comprising:
a plurality of straight waveguides each provided between each of said plurality of second optical waveguides and each of said plurality of multi-mode waveguides, each of the said plurality of straight waveguides having a width narrower than the second optical waveguide width of each of said plurality of second optical waveguides.

29. An arrayed waveguide grating optical multiplexer/demultiplexer according to claim 25, wherein each of said plurality of multi-mode waveguides has a trapezoidal shape in which the third end portion is an upper base and the fourth end portion is a lower base.

30. An arrayed waveguide grating optical multiplexer/demultiplexer comprising:
at least one first optical waveguide;
a first slab waveguide;
an arrayed waveguide connected to said at least one first optical waveguide via said first slab waveguide, said arrayed waveguide comprising a plurality of channel waveguides each of which has a different length;
a second slab waveguide;
a plurality of second optical waveguides connected to said arrayed waveguide via said second slab waveguide;
at least one first multi-mode waveguide having a first end portion and a second end portion, a second width of the second end portion being larger than a first width of the first end portion, the first end portion of each of said at least one first multi-mode waveguide being connected to each of said at least one first optical waveguide, the second end portion of each of said at least one first multi-mode waveguide being connected to said first slab waveguide, a width of said at least one first multi-mode waveguide increasing from the first end portion toward the second end portion and being configured to realize multi-mode; and
a plurality of second multi-mode waveguides each having a third end portion and a fourth end portion, a fourth width of the fourth end portion being larger than a third width of the third end portion, the third end portion of each of said plurality of second multi-mode waveguides being connected to each of said plurality of second optical waveguides, the fourth end portion of each of said plurality of second multi-mode waveguides being connected to said second slab waveguide, a width of said second multi-mode waveguides increasing from the third end portion toward the fourth end portion and being configured to realize multi-mode.

31. An arrayed waveguide grating optical multiplexer/demultiplexer according to claim 30, further comprising:
at least one first constant width waveguide each provided between each of said at least one first optical waveguide and each of said at least one first multi-mode waveguide, the first constant width waveguide having a substantially constant width which is substantially equal to the first width of the first end portion of said at least one first multi-mode waveguide.

32. An arrayed waveguide grating optical multiplexer/demultiplexer according to claim 31, further comprising:
a plurality of second constant width waveguides each provided between each of said plurality of second optical waveguides and each of said plurality of multi-mode waveguides, each of the second constant width waveguides having a substantially constant width which is substantially equal to the third width of the third end portion.

33. An arrayed waveguide grating optical multiplexer/demultiplexer according to claim 32, further comprising:
at least one first straight waveguide each provided between each of said at least one first optical waveguide and each of said at least one first constant width waveguide, the at least one first straight waveguide having a width narrower than the first optical waveguide width of said at least one first optical waveguide.

34. An arrayed waveguide grating optical multiplexer/demultiplexer according to claim 33, further comprising:
a plurality of second straight waveguides each provided between each of said plurality of second optical waveguides and each of said plurality of second constant width waveguide, each of the second straight waveguides having a width narrower than the second optical waveguide width of each of said plurality of second optical waveguides.

35. An arrayed waveguide grating optical multiplexer/demultiplexer according to claim 31, further comprising:
at least one first straight waveguide each provided between each of said at least one first optical waveguide and each of said first constant width waveguide, the first straight waveguide having a width narrower than the first optical waveguide width of said at least one first optical waveguide.

36. An arrayed waveguide grating optical multiplexer/demultiplexer according to claim 30, further comprising:
a plurality of second constant width waveguides each provided between each of said plurality of second optical waveguides and each of said plurality of second multi-mode waveguides, the second constant width waveguides each having a substantially constant width which is substantially equal to the third width of the third end portion.

37. An arrayed waveguide grating optical multiplexer/demultiplexer according to claim 36, further comprising:
a plurality of second straight waveguides each provided between each of said plurality of second optical waveguides and each of said plurality of second constant width waveguides, the second straight waveguides each having a width narrower than the second optical waveguide width of each of said plurality of second optical waveguides.

38. An arrayed waveguide grating optical multiplexer/demultiplexer according to claim 37, further comprising:
at least one first constant width waveguide each provided between said at least one first optical waveguide and said at least one first multi-mode waveguide, the at least one first constant width waveguide having a substantially constant width which is substantially equal to the first width of the first end portion of said at least one first multi-mode waveguide.

39. An arrayed waveguide grating optical multiplexer/demultiplexer according to claim 30, further comprising:
at least one first straight waveguide each provided between each of said at least one first optical waveguide and each of said at least one first multi-mode waveguide, the at least one first straight waveguide having a width narrower than the first optical waveguide width of said at least one first optical waveguide.

40. An arrayed waveguide grating optical multiplexer/demultiplexer according to claim 39, further comprising:
a plurality of second straight waveguides each provided between each of said plurality of second optical waveguides and each of said plurality of second multi-mode waveguides, the second straight waveguides each having a width narrower than the second optical waveguide width of each of said plurality of second optical waveguides.

41. An arrayed waveguide grating optical multiplexer/demultiplexer according to claim 30, further comprising:
a plurality of second straight waveguides each provided between each of said plurality of second optical waveguides and each of said plurality of second multi-mode waveguides, the second straight waveguides each having a width narrower than the second optical waveguide width of each of said plurality of second optical waveguides.

42. An arrayed waveguide grating optical multiplexer/demultiplexer according to claim 30, wherein said at least one first multi-mode waveguide has a trapezoidal shape in which the first end portion is an upper base and the second end portion is a lower base, and wherein each of said plurality of second multi-mode waveguides has a trapezoidal shape in which the third end portion is an upper base and the fourth end portion is a lower base.

43. A multi-mode waveguide comprising:
a first end portion; and
a second end portion having a second width larger than a first width of the first end portion, the first end portion being configured to be connected to a first optical waveguide, the second end portion being configured to be connected to a first slab waveguide, a width of said multi-mode waveguide increasing from the first end portion toward the second end portion and being configured to realize multi-mode.

44. An optical waveguide circuit comprising:
a multi-mode waveguide comprising:
a first end portion; and
a second end portion having a second width larger than a first width of the first end portion, the first end portion being configured to be connected to a first optical waveguide, the second end portion being configured to be connected to a first slab waveguide, a width of said multi-mode waveguide increasing from the first end portion toward the second end portion and being configured to realize multi-mode.

45. An optical waveguide circuit according to claim 44, wherein said multi-mode waveguide has a trapezoidal shape in which the first end portion is an upper base and the second end portion is a lower base.

* * * * *

UNITED STATES PATENT AND TRADEMARK OFFICE
CERTIFICATE OF CORRECTION

PATENT NO. : 6,836,591 B2
DATED : December 28, 2004
INVENTOR(S) : Kashihara et al.

It is certified that error appears in the above-identified patent and that said Letters Patent is hereby corrected as shown below:

Title page,
Items [45] and [*] Notice, should read:
-- [45] **Date of Patent: *Dec. 28, 2004**

[*] Notice: Subject to any disclaimer, the term of this patent is extended or adjusted under 35 U.S.C. 154(b) by 0 days.

This Patent is subject to a terminal disclaimer. --

Signed and Sealed this

Twenty-ninth Day of March, 2005

JON W. DUDAS
*Director of the United States Patent and Trademark Office*